United States Patent [19]

Tonelli et al.

[11] Patent Number: 5,831,610
[45] Date of Patent: Nov. 3, 1998

[54] DESIGNING NETWORKS

[75] Inventors: Daniel L. Tonelli, Hopkinton; Kevin M. Maloney, Swampscott; Kevin W. Cronin, Norfolk; Martin H. Katz, Framingham, all of Mass.

[73] Assignee: NetSuite Development L.P., Wayland, Mass.

[21] Appl. No.: 606,327

[22] Filed: Feb. 23, 1996

[51] Int. Cl.$^6$ ..................................................... G06F 3/00
[52] U.S. Cl. ........................................ 345/335; 395/200.5
[58] Field of Search ........................... 395/335, 200.02, 395/200.3, 200.48, 200.51, 200.53, 200.54, 200.5

[56] References Cited

U.S. PATENT DOCUMENTS

| | | | |
|---|---|---|---|
| 5,394,522 | 2/1995 | Sanchez-Frank et al. | 345/349 |
| 5,671,355 | 9/1997 | Collins | 395/200.8 |

OTHER PUBLICATIONS

Polilli, S. "Network Design Tool Simaulates testing," InfoWorld Jul. 18, 1994, V16, N29, P37(2).
Edwards, B., "NetGuru Network Design 101," LAN Times, Sep. 19, 1994, V11, N19, p89(2).
Tam, T., "NetGuru Simulator removes change's risk," PC Week, Oct. 2, 1995, V12, N39, pN5(2).
Muller, N.J., "Design and Conquer," Byte, Oct. 1996, V21, N10, p93(4).
Letter, "Information Disclosure Statement" dated Aug. 5, 1996.
NetGuru Manager—Revolutionary Planning and Operations Software for the Network Professional.
PCWeek—Netweek, Sep. 26, 1994.
ACH—American Hytech Corporation—NetGuru Customer Comments.
Network Planning and Documentation with NetGuru Manager.
NetGuru—Distributed by One Call Systems, Inc. (advertisement).
Jander, Mary—Data Communications—Design Tools Take a Step Closer to the Real World.
CoroNet Managing Nicely—Information Week, Jun. 19, 1995.

*Primary Examiner*—A. Katbab
*Attorney, Agent, or Firm*—Fish & Richardson P.C.

[57] ABSTRACT

A method for designing networks including placing device icons representing intelligent device objects on a network design sheet, selecting a media type representing an intelligent media object, and connecting the media type to a first one of the device icons. The method further includes validating the connection to the first one of the device icons.

44 Claims, 38 Drawing Sheets

Microfiche Appendix Included
(31 Microfiche, 2970 Pages)

Note the level of detail. Any port protocol changes are logged. 49

The log is sorted by media types. 51

| | | NetSuite Professional Design: Bill of Materials | |
|---|---|---|---|

OK | Copy | Copy All | Print | Workorders | Save | Help

DEVICES NEEDED

| # | Manufacturer | Part Number | Short Description |
|---|---|---|---|
| 1 | HP | C3142A | 600X600 DPI, 16PPM, with Enet/Local Talk Adapter |
| 1 | Zeos_intl | PanteraServer | Pentium, 120Mhz, Deskside, 3 PCI, 5 ISA Slots |
| 1 | DEC | DETPM-AA | AUI to 10BaseT Transceiver |
| 1 | Cisco | CX-EIP2 | 2 Port Ethernet Interface Processor, AUI |
| 1 | Cisco | CX-FSIP4 | 4 Port HS-WAN Interface Processor, DB60 |
| 7 | 3Com | 3C590-TPO | EtherLink III, NIC for PCI Systems, 10BaseT(no AUI) |
| 2 | Zeos_intl | Pentium-75 | Pentium, 75 Mhz, Desktop, 3 PCI, 5 ISA Slots |
| 4 | Zeos_intl | 486DX4100 | 486DX4, 100Mhz, Desktop, 3 PCI, 4 ISA Slots |
| 1 | GENSERV | Frame Relay | Frame Relay Service |

Media Palette

DESIGNING NETWORKS

BACKGROUND

This invention relates to designing networks.

In recent years telecommunications networks have evolved into one of the most crucial elements of business and society. During the 1980's and early 1990's major changes in network architectures have taken place. Data networks that were hierarchical in nature have moved to more distributed topologies. Voice, video, and data are now being combined into digital bit streams. The trend is for network services that are faster, cheaper, and open to wide ranges of services and information.

Local Area Networks (LANs) have become entrenched as the foundation for the new paradigm in corporate computing, known as Client-Server. For technical and economic reasons major corporations are moving away from large mainframe computers to higher-performance, lower-priced platforms. Standard desktop devices are now extremely powerful personal computers, connected to each other via LANs; and LANs themselves are interconnected to form what is known as an internetwork—the transport vehicle for wide ranges of applications, and the cornerstone for present and future communication architectures.

The internetwork is a mixture of hardware and software technologies. The hardware includes things such as routers, hubs, LAN adapters, digital and analog circuits, multiplexers, and switches of many varieties as well as desktop workstations and servers. Elements are combined into networks that extend from a single workgroup, floor, or building, to campuswide, metropolitan, and nationwide areas. Internetworking software includes elements such as protocol stacks (such as TCP/IP), device drivers, operating systems, and applications. When an internetwork infrastructure is assembled correctly it can create a computing environment which—while dauntingly complex—is nevertheless extremely powerful, and can be considered among a corporation's most valuable assets.

Mission-critical applications depend on this complex internetwork—from off-the-shelf solutions like electronic mail and file sharing, to complex database inquiry and transaction-processing systems. Such applications will continue to flourish throughout this decade and on beyond 2000. Development continues at a frenetic pace in the areas of client-server and multimedia applications. In addition, the "Information Highway" is beginning to take shape, and commercial internetworking will soon be available to everyone from multinational enterprises to smaller service-oriented businesses.

Distributed networks are composed of such a large number of elements that are both network-specific (routers, hubs, switches, facilities, etc.) and non-network-specific (servers, workstations, operating systems, application software, etc.) that just keeping track of where they are is a tough task, let alone how they interact as a system. In addition, each element has its own behavioral characteristics and likely comes from a different vendor. As systems made up of these elements experience change or encounter problems—congestion, circuit failure, or component degradation—overall effects can range from a minor slowdown to complete collapse.

While businesses are becoming increasingly dependent on internetworking, little attention has been paid to the process of correctly designing and implementing these networks. On one hand businesses pay dearly for high-priced hardware resellers and systems integrators to recommend vendor solutions—and on the other hand businesses that recognize the critical nature of these networks pay an even higher price for after-the-fact "network management" solutions from hardware system vendors. Despite the high price tag, however, most data engineering shops validate their network design by building the network, throwing real live users' traffic at it, and analyzing how well it runs.

SUMMARY

This file contains a microfiche appendix with 2970 microfiche images on 31 microfiche cards.

In one aspect, the invention features a method for designing networks including placing device icons representing intelligent device objects on a network design sheet, selecting a media type representing an intelligent media object, and connecting the media type to a first one of the device icons. The method further includes validating the connection to the first one of the device icons.

Implementations of the invention may include the following features. The method may include preventing the connection from being made if the validation indicates an invalid connection, and prompting a user to take additional actions before completing the connection if the validation indicates that the connection is invalid but can be made valid. Additional actions may include configuring the first one of the device icons to include an adapter card and adding an additional device icon to the network. The method may further include connecting the media type to second one of the device icons and validating the connection to the second one of the device icons. The media connection between the first and second ones of the device icons may be validated, and the connection to the second one of the device icons may be prevented from being made if the validation indicates an invalid connection. If the validation indicates that the connection is invalid but can be made valid, the method may include prompting a user to take additional actions before completing the connection to a second one of the device icons.

Embodiments of the invention may exhibit one or more of the following advantages. The network design software allows users to quickly and easily design networks and generate diagrams and documentation, including workorders and bills of materials. Through a design database and a rules engine, the network design software has the intelligence ("network aware") to know the features and constraints of network devices and media. With this intelligence, the network design software prevents the user from making invalid connections and, where possible, assists the user in configuring devices to make otherwise invalid connections valid.

Technology changes are easily incorporated into the network design system by updating or adding new intelligent device objects to the device database and by updating or adding rules to the rules engine. As a result, users may quickly update existing networks or design new networks with new technologies while the network design software validates each connection.

Many time saving mechanisms are also provided, for example, if a configured device is to be replicated multiple times across a network, the user may clone the device or add it to a device palette. The user may also generate custom device palettes filled with devices commonly included in the user's networks. Users may logically partition groups of devices in a complex network into collections and replicate these collections within the same network design or add these collections to other network designs. Displaying a complex network as an interconnection of various collections simplifies the user's view of the network while providing easy access to the different hierarchical levels. A user's view of a network is also simplified through a spreadsheet view window which provides the user with a "bird's eye view" of all the devices and media in a current network.

Additional advantages and features are apparent from the following.

DESCRIPTION

FIG. 3e is a computer screen display of a bill of materials.

FIGS. 16a–16c, 17, 18, 19, 20, and 21 are computer screen displays of a Device Properties dialog box.

Figure 22:
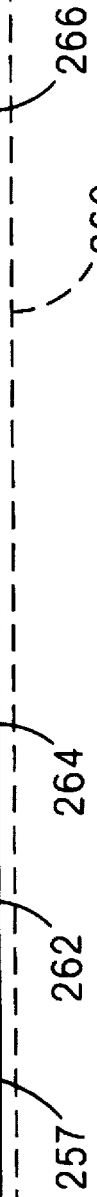

FIG. 22 is a computer screen display of a Spreadsheet View window.

Figure 23:
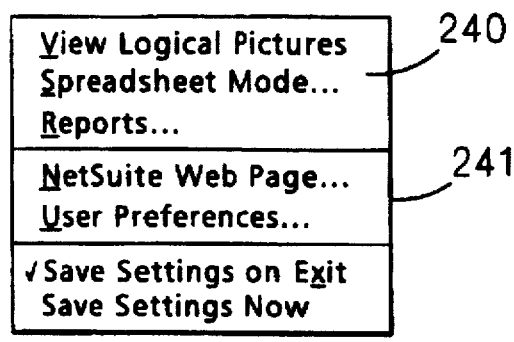

FIG. 23 is a computer screen display of a Special menu.

Figure 24:
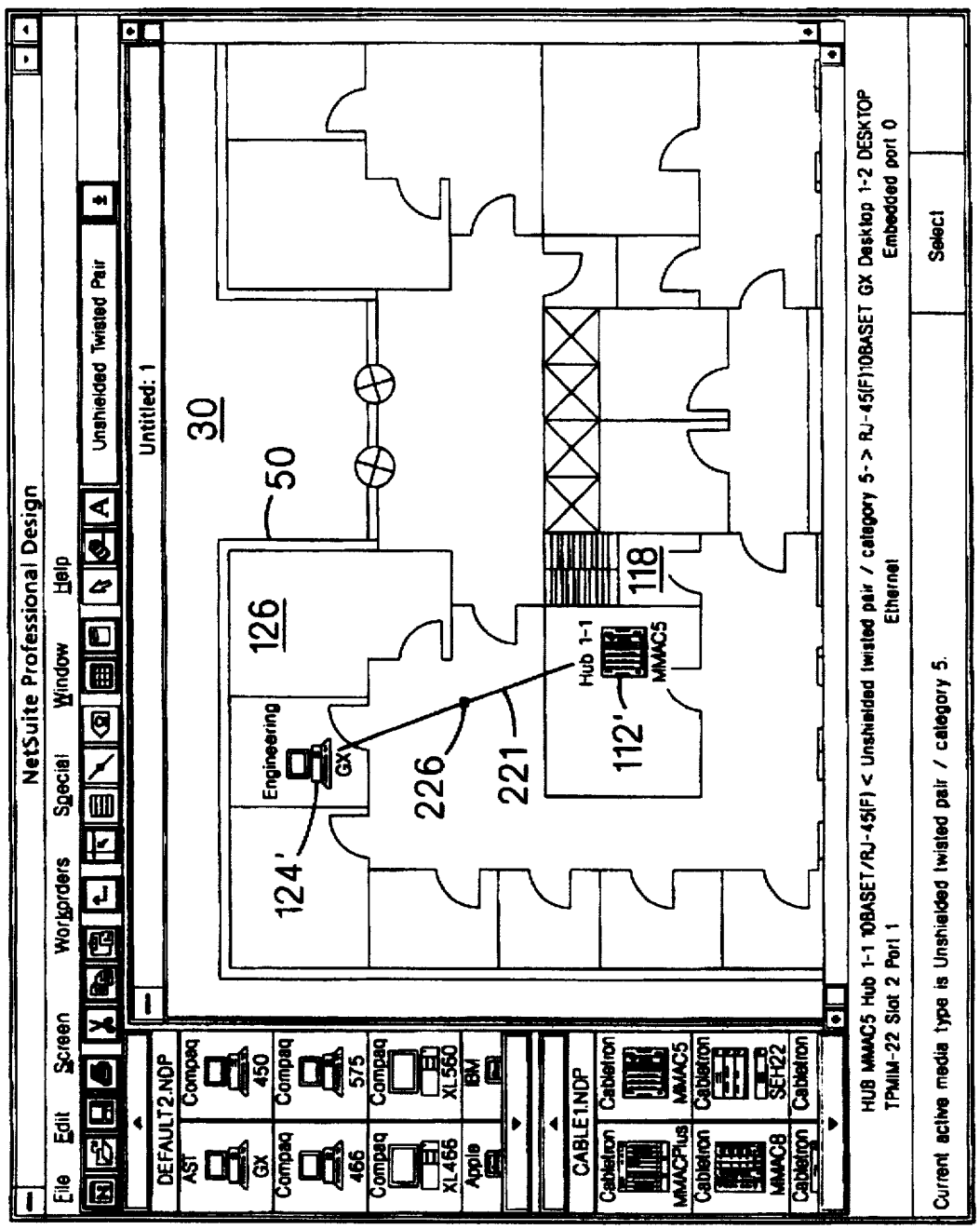

FIG. 24 is a computer screen display of a network application design window including a simple two device network.

Figure 25:
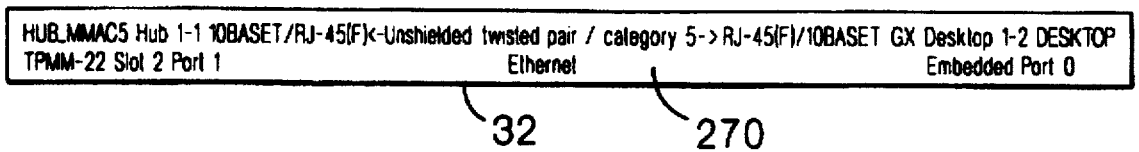

FIG. 25 is a computer screen display of a status bar.

Figure 26:
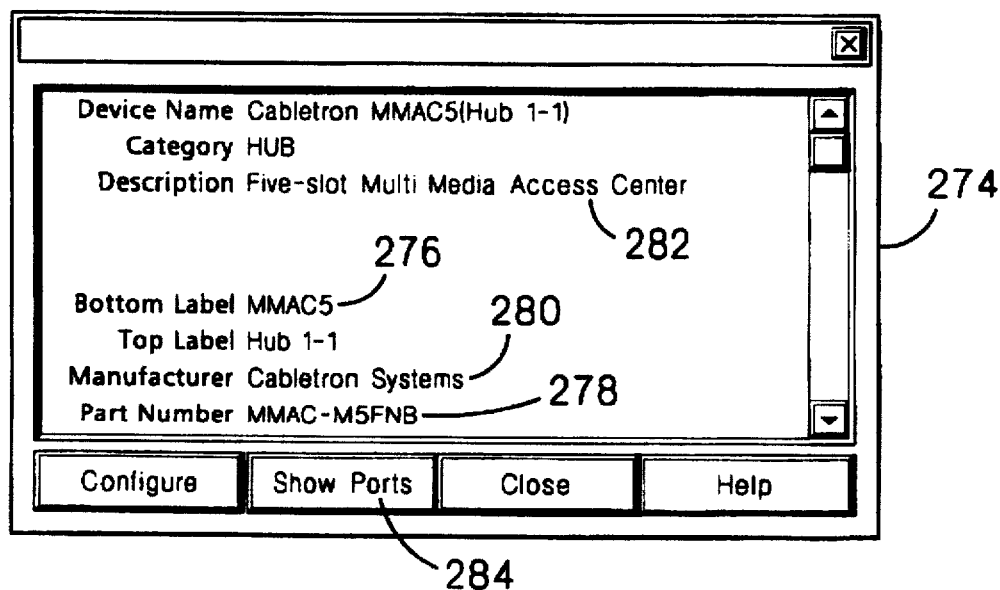
Figure 27:
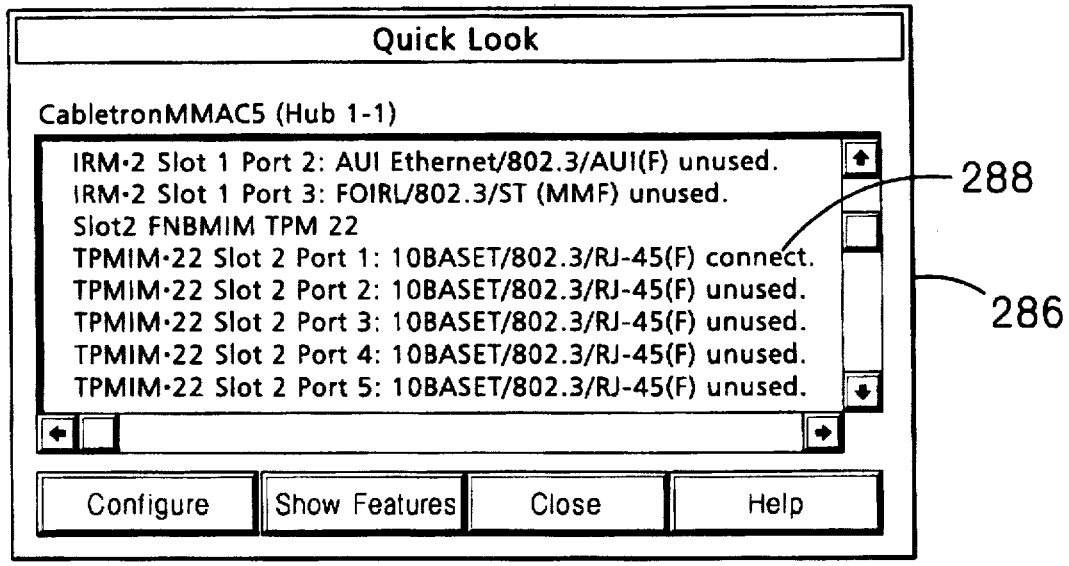

FIGS. 26 and 27 are computer screen displays of Quick Look windows.

Figure 28:
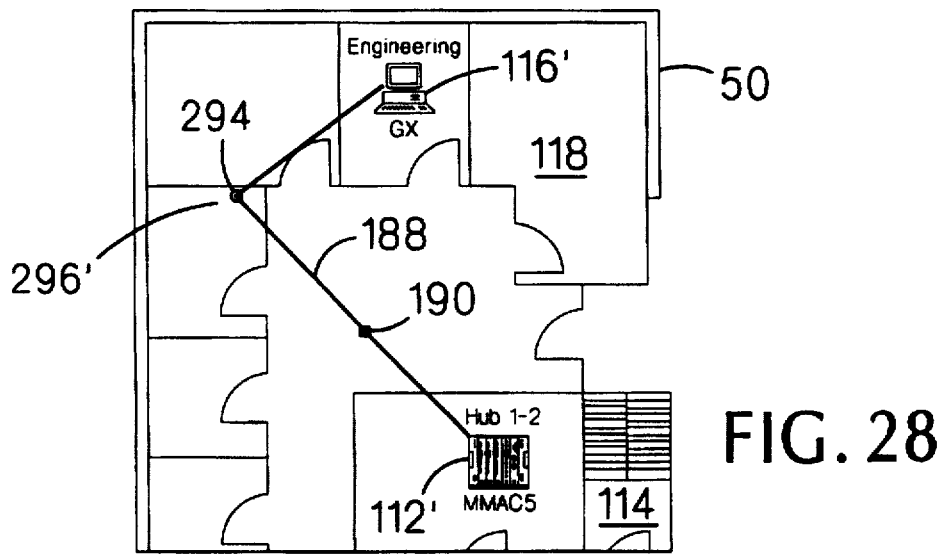

FIG. 28 is a computer screen display of a portion of a network application design window including a simple two device network having a connection bent around a junction point.

Figure 29:
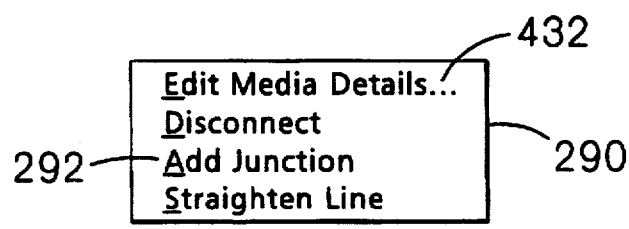

FIG. 29 is a computer screen display of a media pop-up menu.

Figure 30:
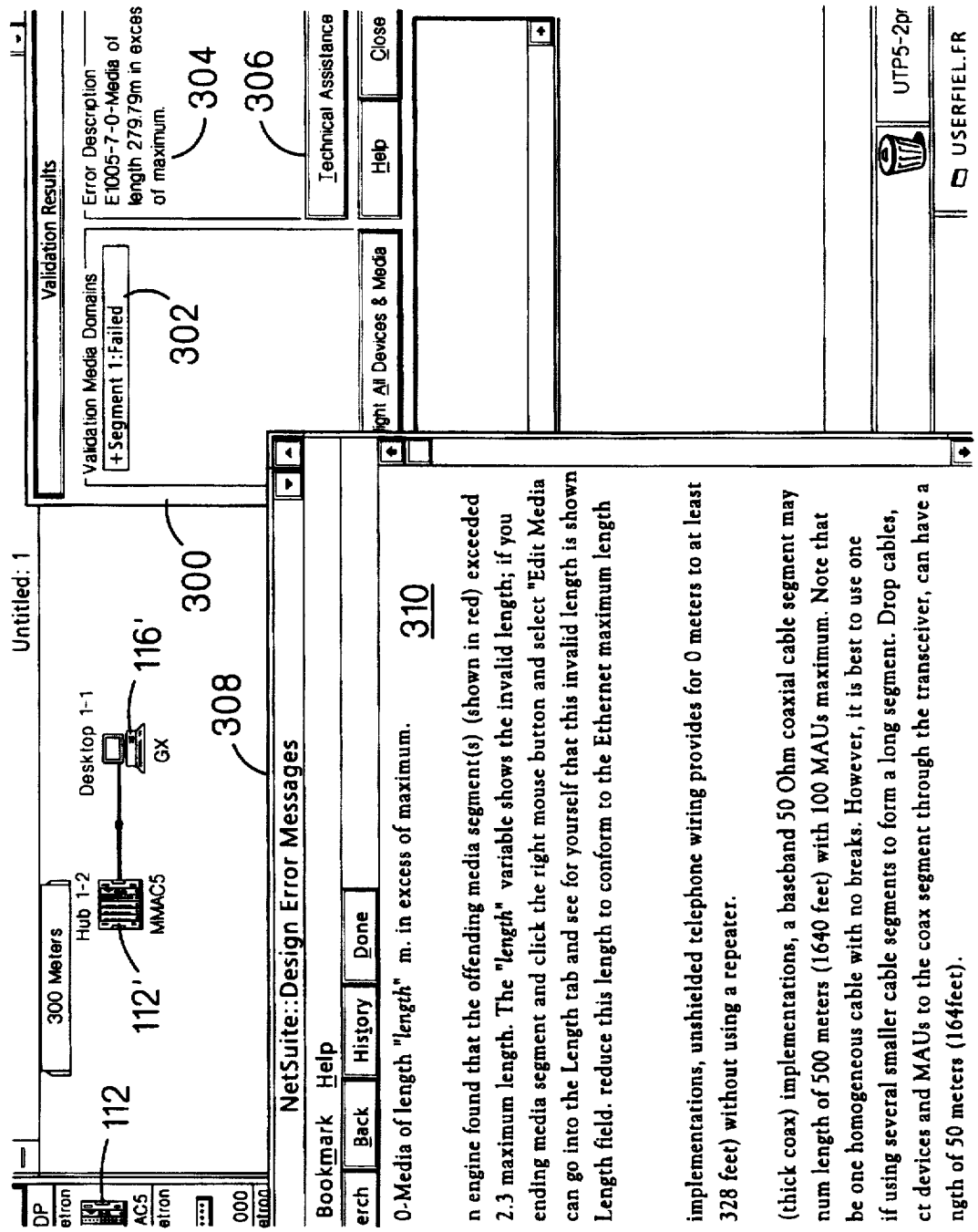

FIG. 30 is a computer screen display of a Validation Results window and a Design Error Message box.

Figure 31:
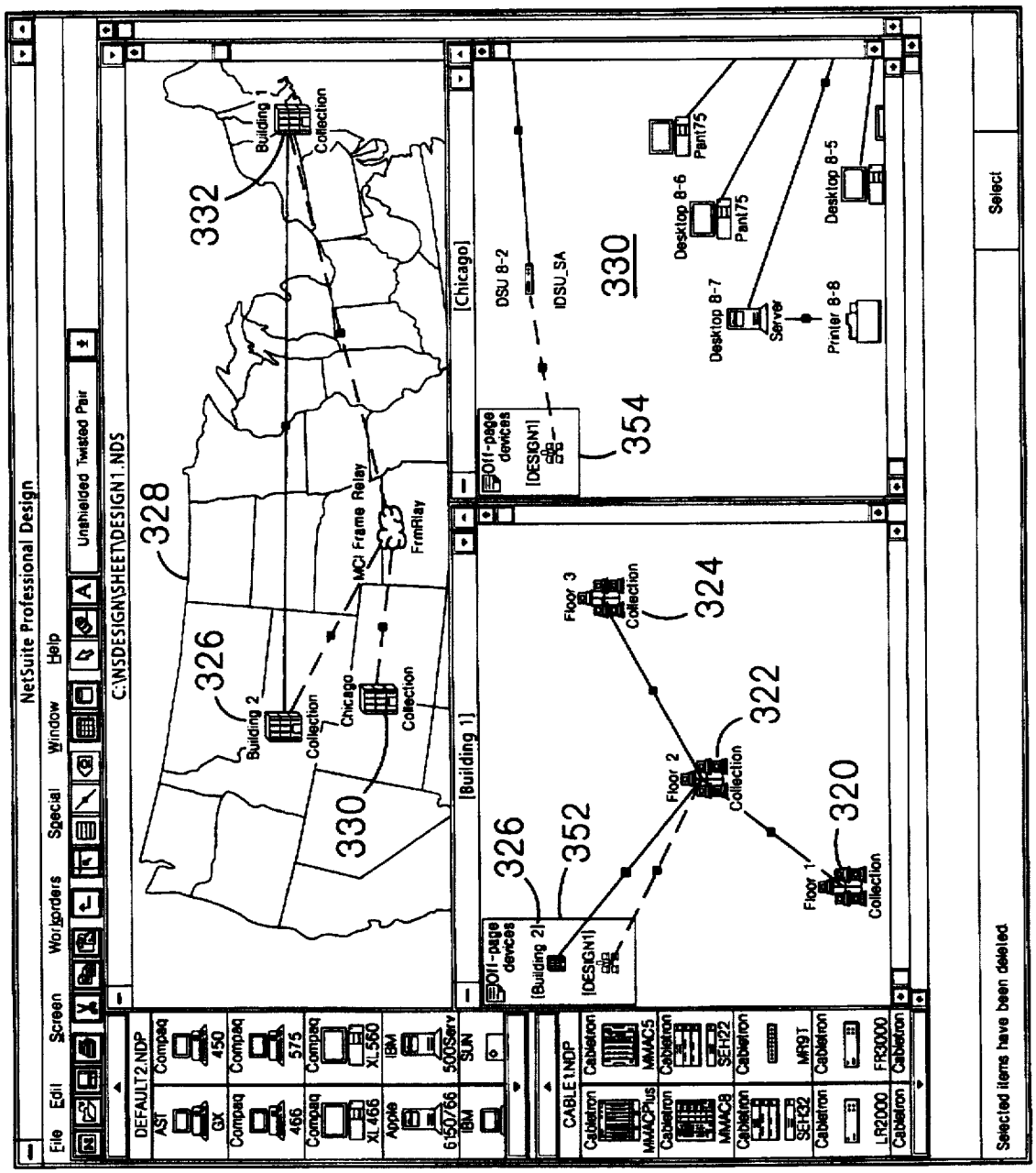

FIG. 31 is a computer screen display of a complex network logically divided into several collections.

Figure 32:
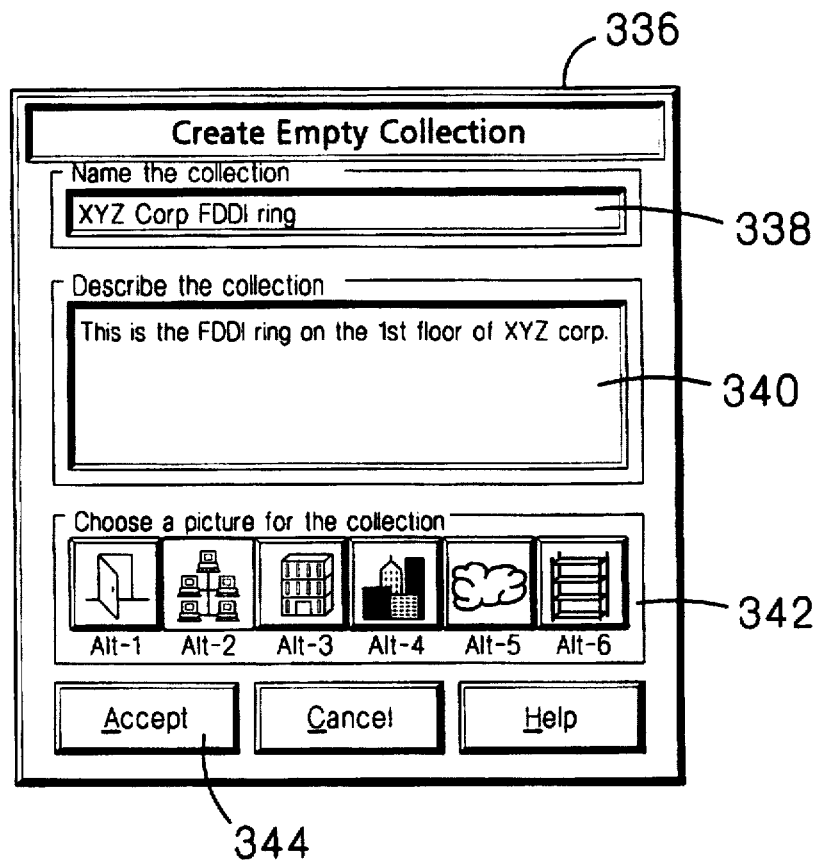

FIG. 32 is a computer screen display of a Create Empty Collection dialog box.

Figure 33:
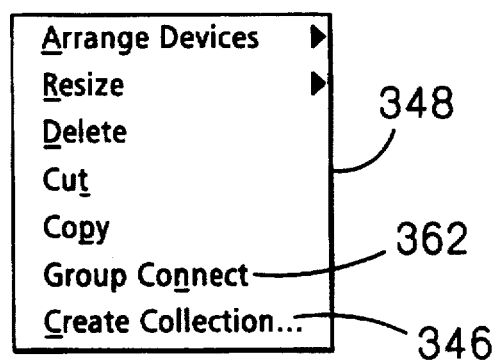

FIG. 33 is a computer screen display of a marquee pop-up menu.

Figure 34:
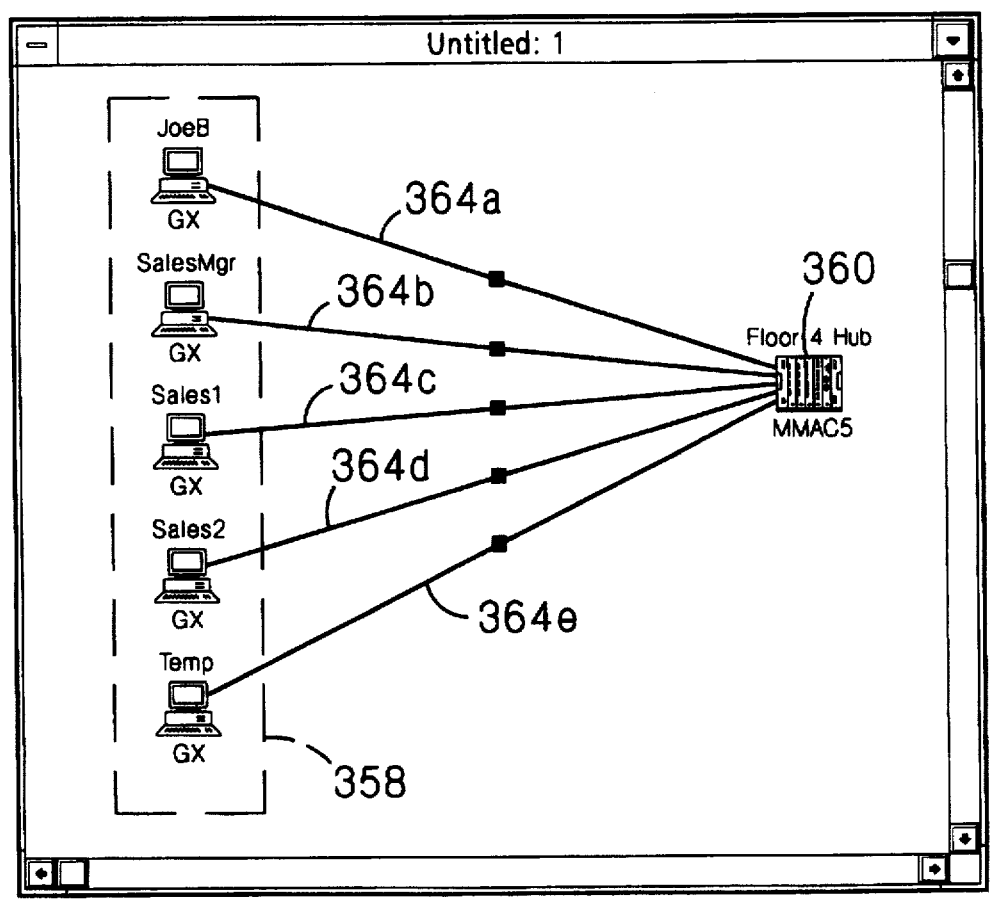

FIG. 34 is a computer screen display of a multiple PCs connected to a hub through a group connect command.

Figure 35:
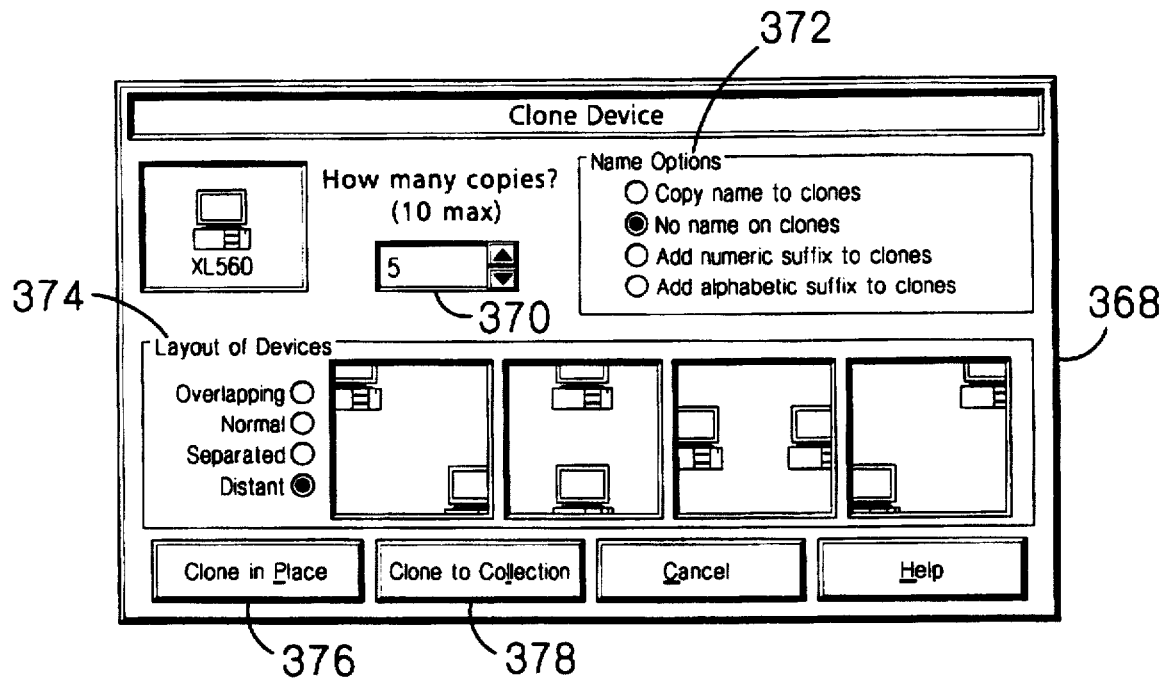

FIG. 35 is a computer screen display of a Clone Device dialog box.

Figure 36:
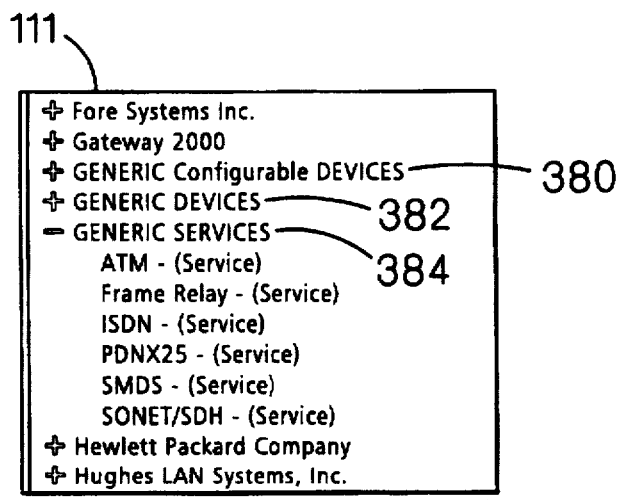

FIG. 36 is a computer screen display of a list of devices stored in a device database.

Figure 37:
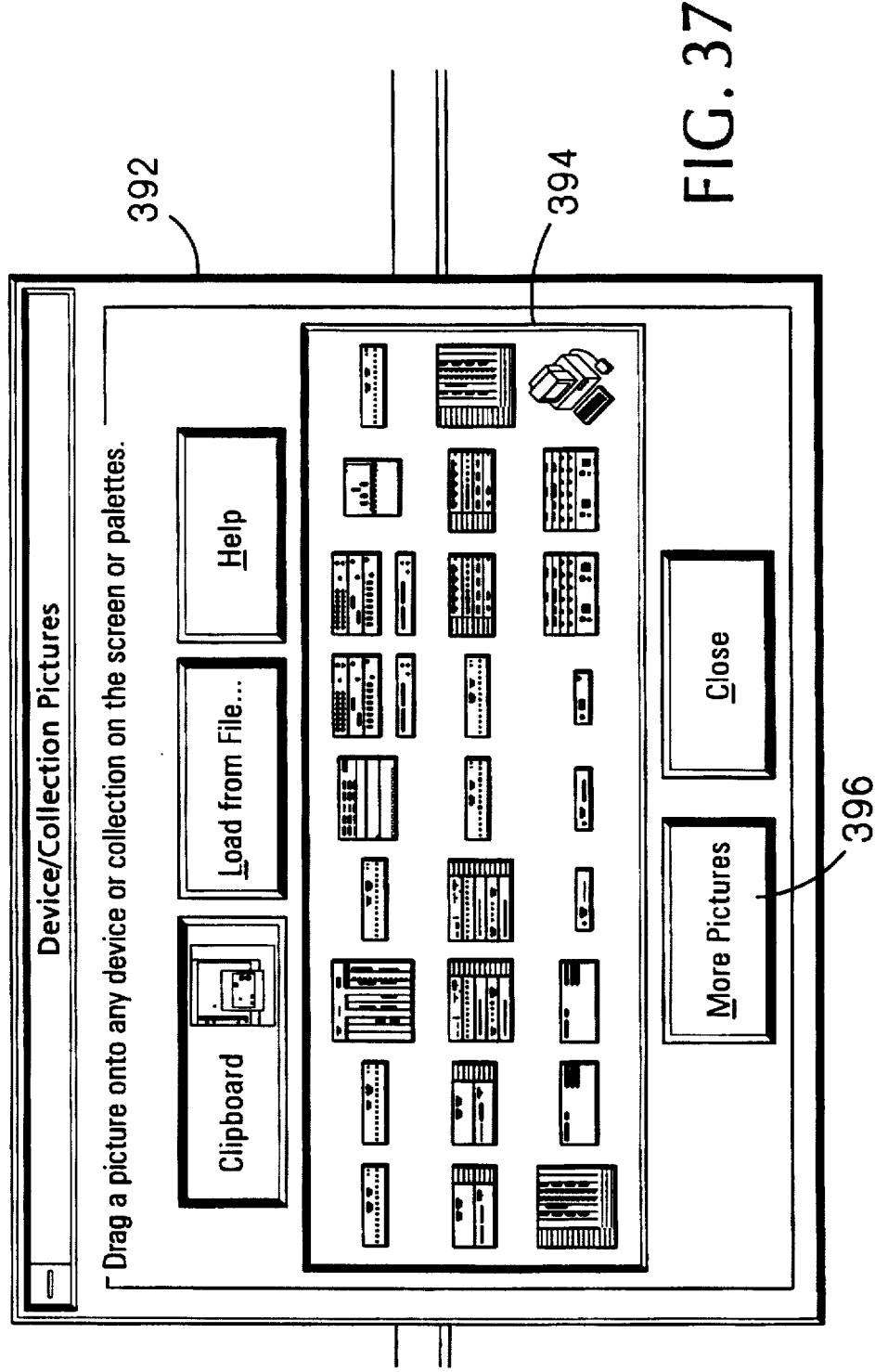
Figure 38:
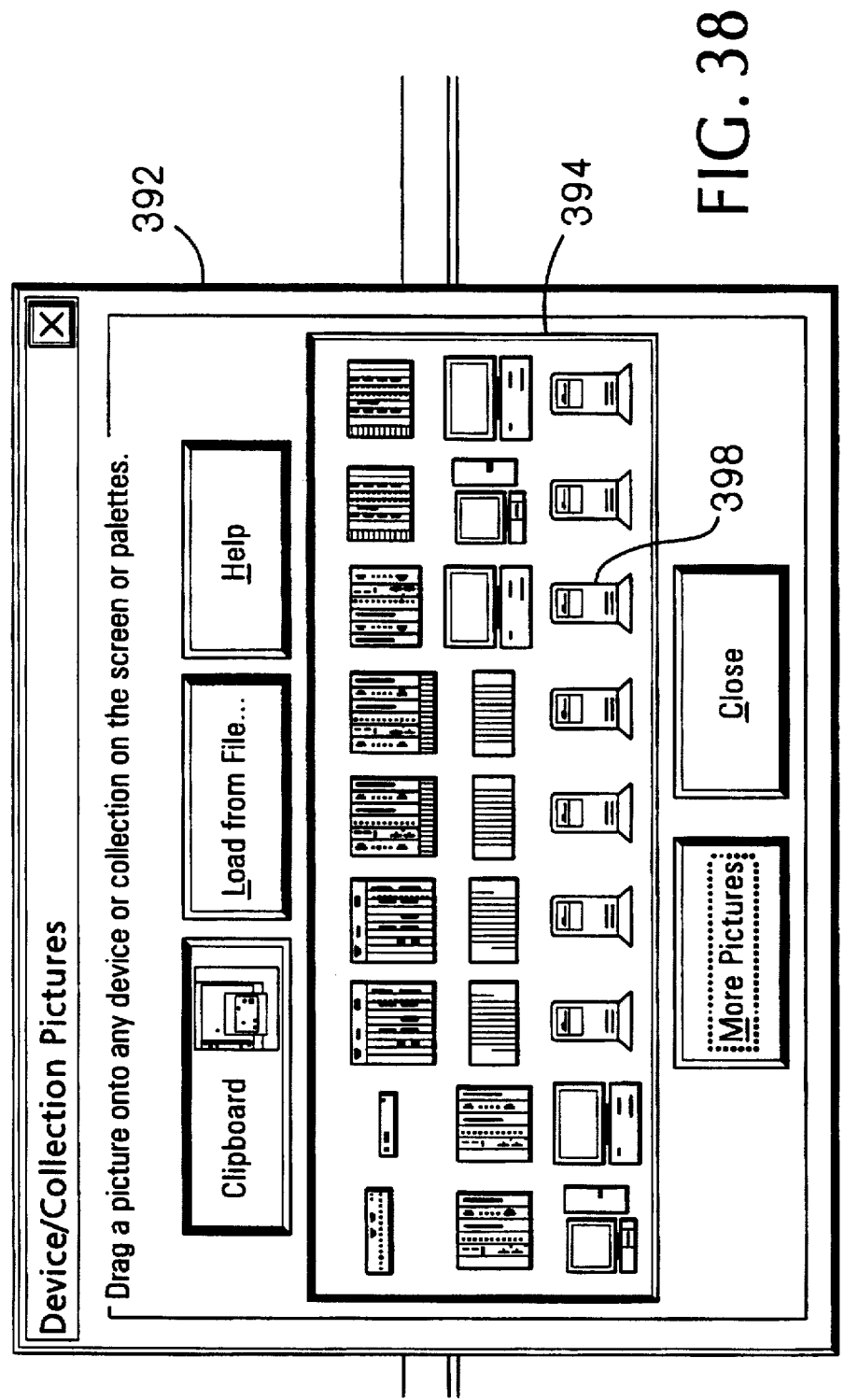

FIGS. 37 and 38 are computer screen displays of a Device/Collection Pictures message box.

Figure 39:
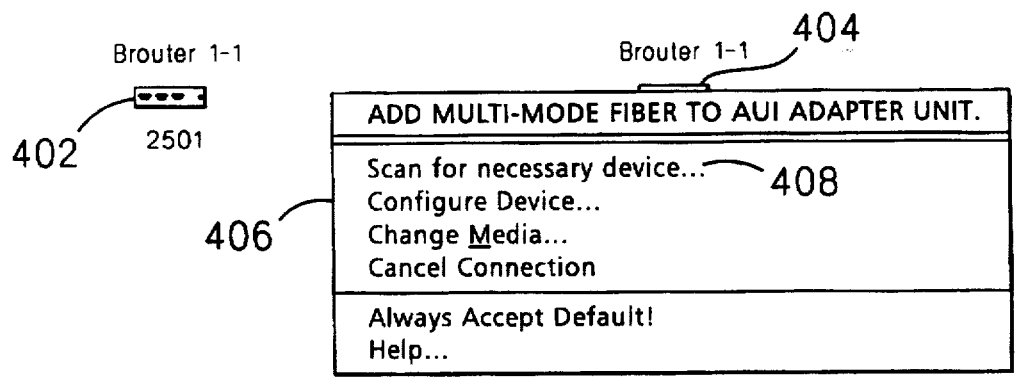
Figure 41:
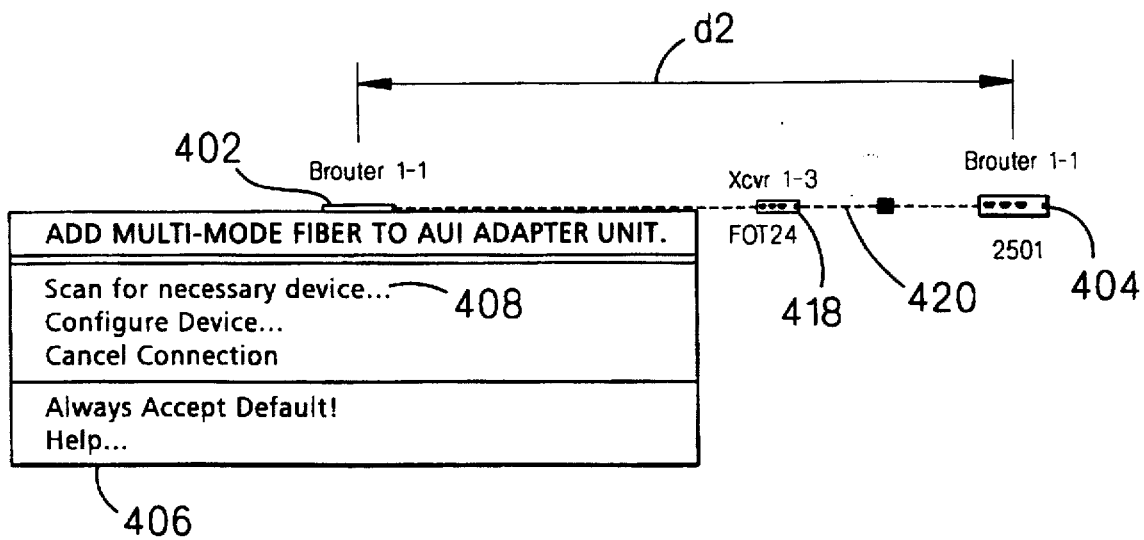

FIGS. 39 and 41 are computer screen displays of an Add Multi-Mode Fiber to AUI Adaptor Unit message box.

Figure 40:
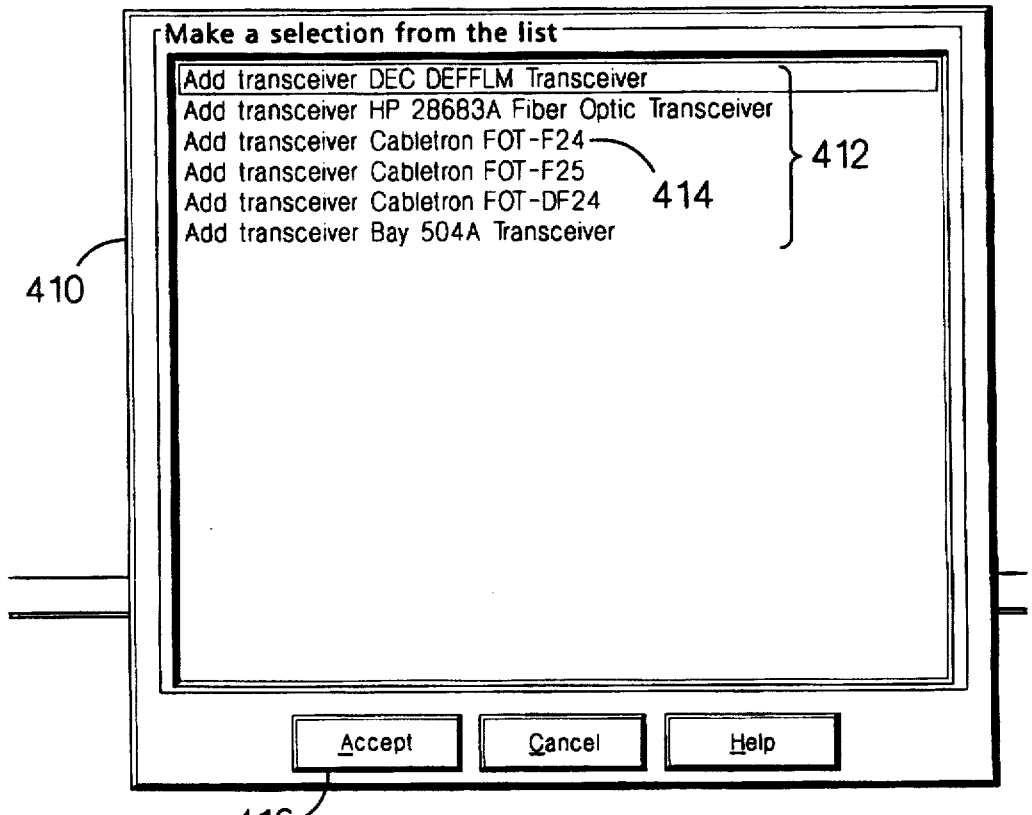

FIG. 40 is a computer screen display of a list of devices that may be added to a network to make a connection valid.

Figure 42:
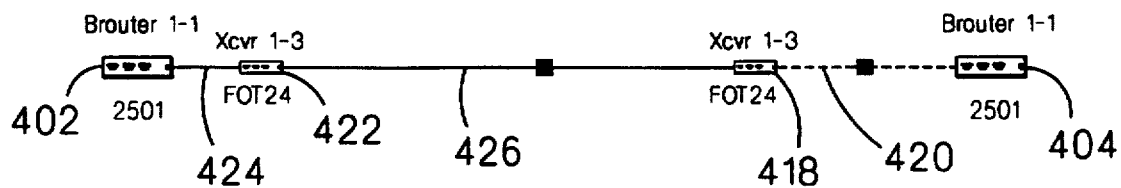

FIG. 42 is a computer screen display of a simple network including two routers and two transceivers.

Figure 43:
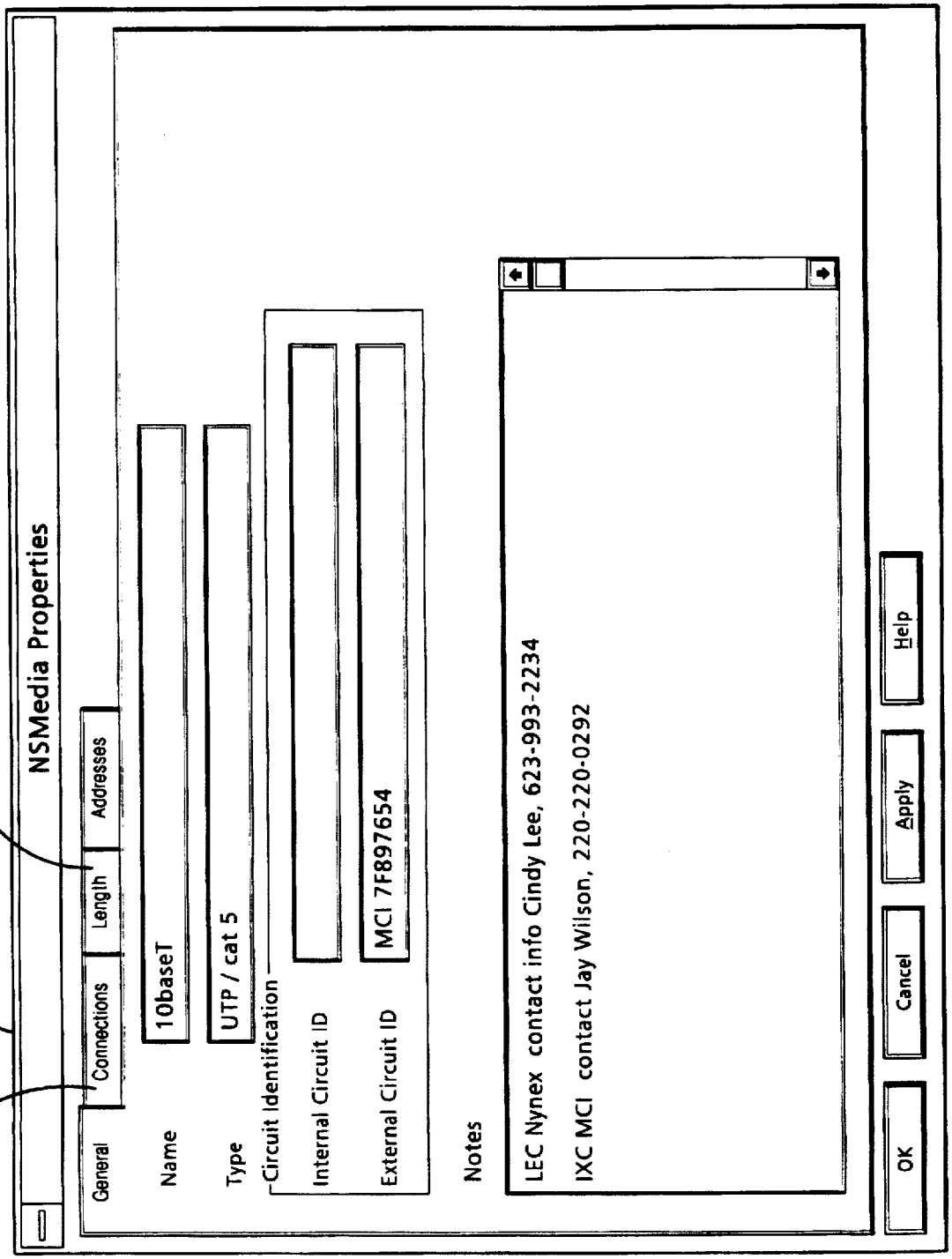
Figure 45:
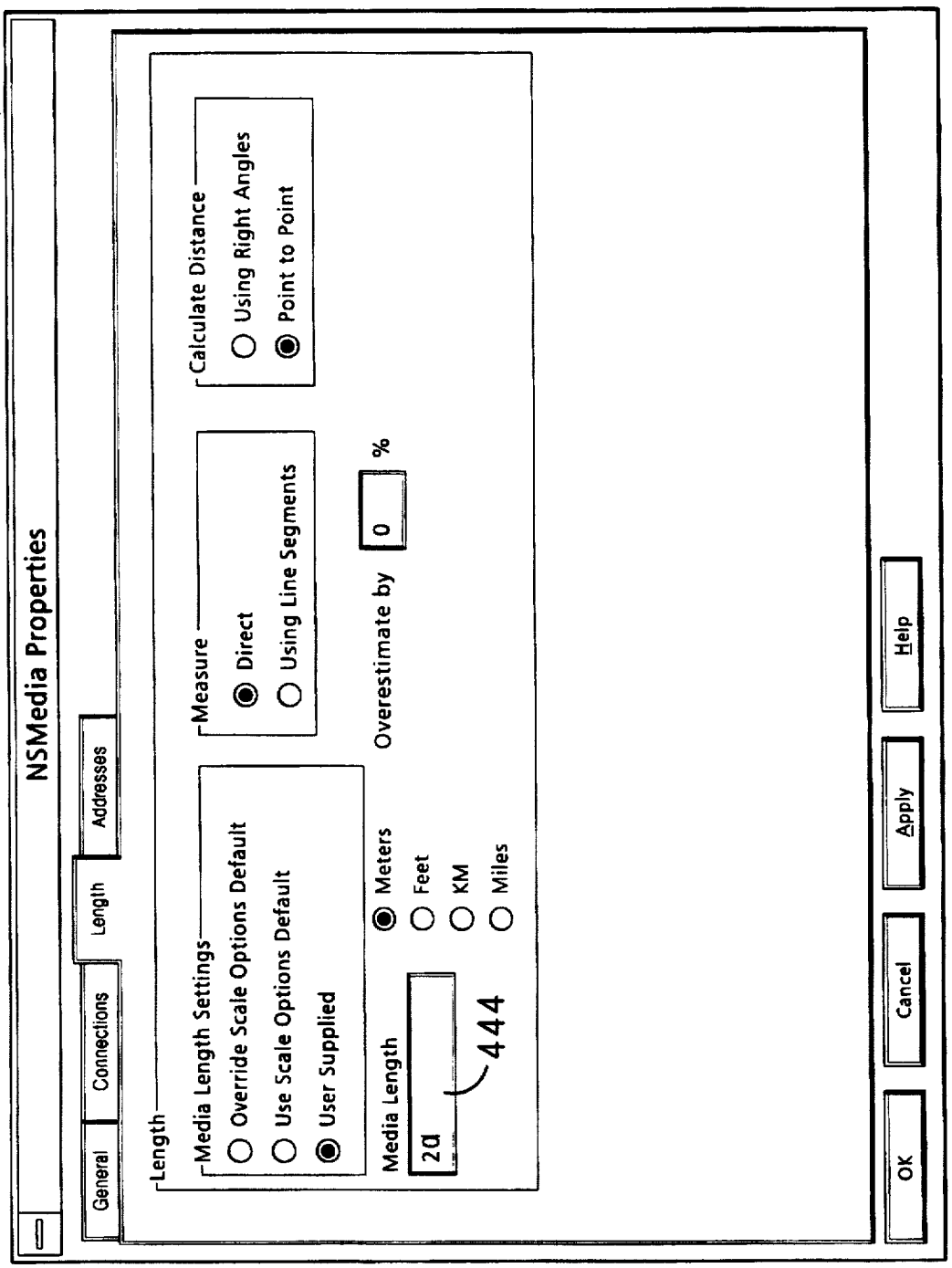

FIGS. 43 and 45 are computer screen displays of a Media Properties dialog box.

Figure 44:
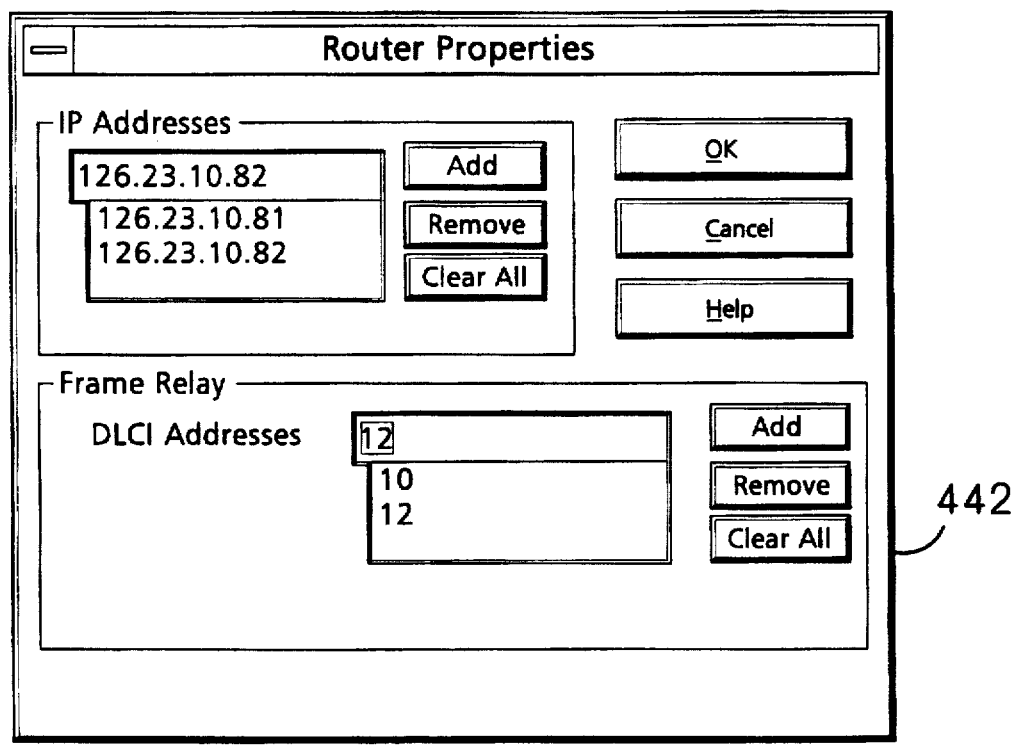

FIG. 44 is a computer screen display of a Router Properties dialog box.

Using network design software, physical data networks are designed, validated, implemented, and documented. A user selects network device icons and connects them together via selected network media icons. Each icon represents an intelligent object that reflects the characteristics of the corresponding device or media. Through a rules engine, the design software validates a network design at several levels. Individual connections are validated as they are made on the basis of criteria such as connector type, physical protocol, logical protocol, and media type. Validation prevents the user from making invalid connections and, where possible, assists the user in completing intermediate configurations that make otherwise invalid connections valid. For example, if a user tries to connect an Ethernet coax cable to a server having a 10BaseT port, the network design software identifies the mismatch and assists the user in configuring a solution. Network designs may also be validated as a whole for conformance at OSI layers 1 and 2, and for conformance to IEEE, ANSI, and EIA/TIA standards. For example, the network design software validates the Ethernet, Token Ring, FDDI/CDDI LAN protocols against IEEE 802 spec, e.g., the length of a cable segment in a local area network (LAN) and the total distance of an FDDI ring are checked against maximums set by the standard, and for an Ethernet network, the network design software checks repeater density, cable lengths, and looks for loops in the topology. After designing and validating a network design, network diagrams, work orders, bills of materials, and custom reports may be generated for circulation to various technical, financial, and management personnel.

Figure 1:
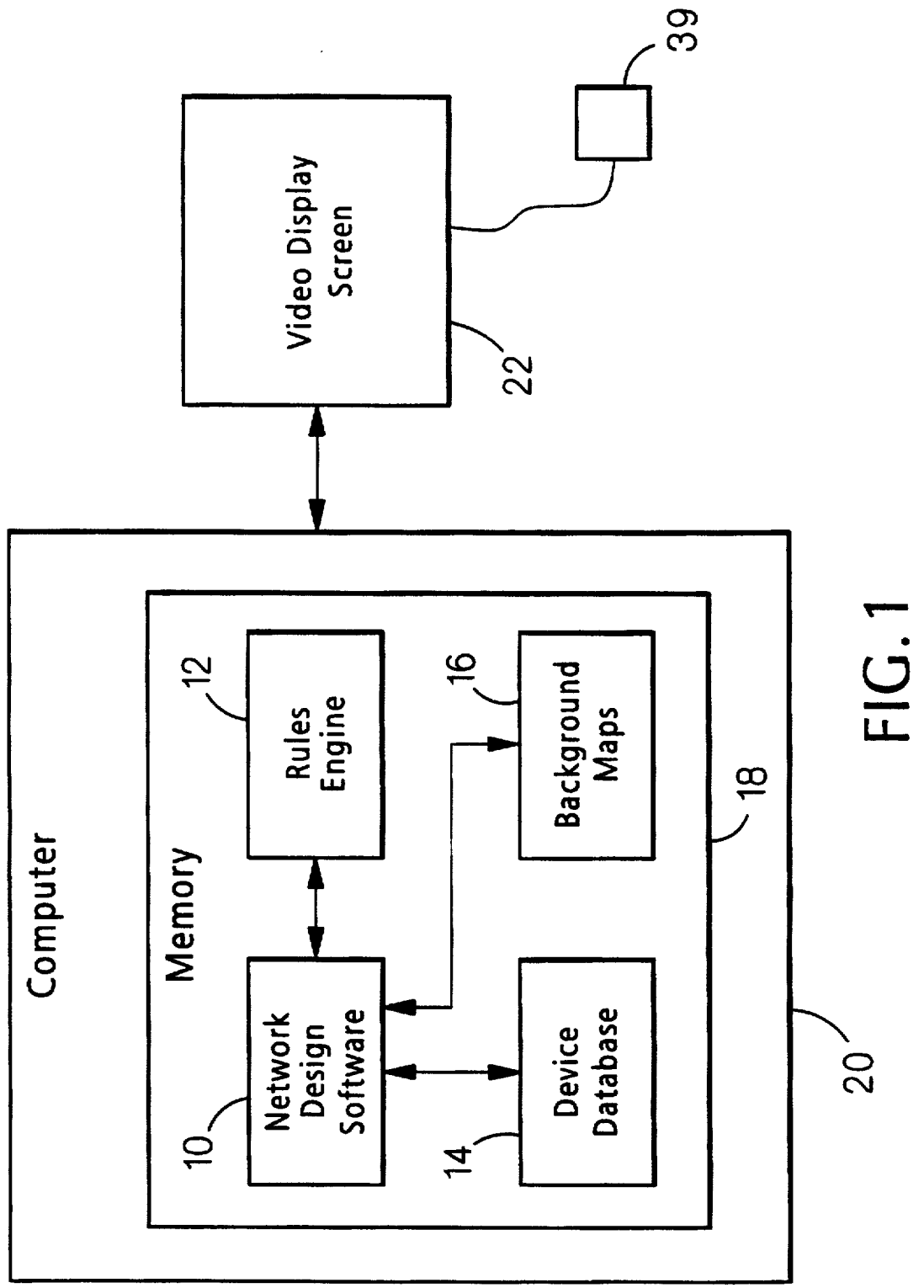
FIG. 1 is a block diagram of a computer loaded with network design software.

Referring to FIG. 1, a user loads network design software 10 and rules engine software 12 into a memory 18 of a computer 20 from, for example, a CD ROM or a 3.5-inch disk. Also stored on the CD ROM or the disk are a device database 14 and background maps 16, all or a portion of which may also be loaded into memory 18. Also loaded on the computer are Windows™ 3.1 or 3.11, Windows for Workgroups™ 3.1 or 3.11, Windows™ 95, or Windows NT™ 3.51 (or later) and DOS 5.0 (or later if using Windows™ 3.1 or Windows for Workgroups™). The computer is an IBM™ PC or compatible 486 (or higher) with 16 MB RAM and a minimum of 10 MB free disk space. The computer is connected to a VGA or higher video display screen 22.

Figure 2:
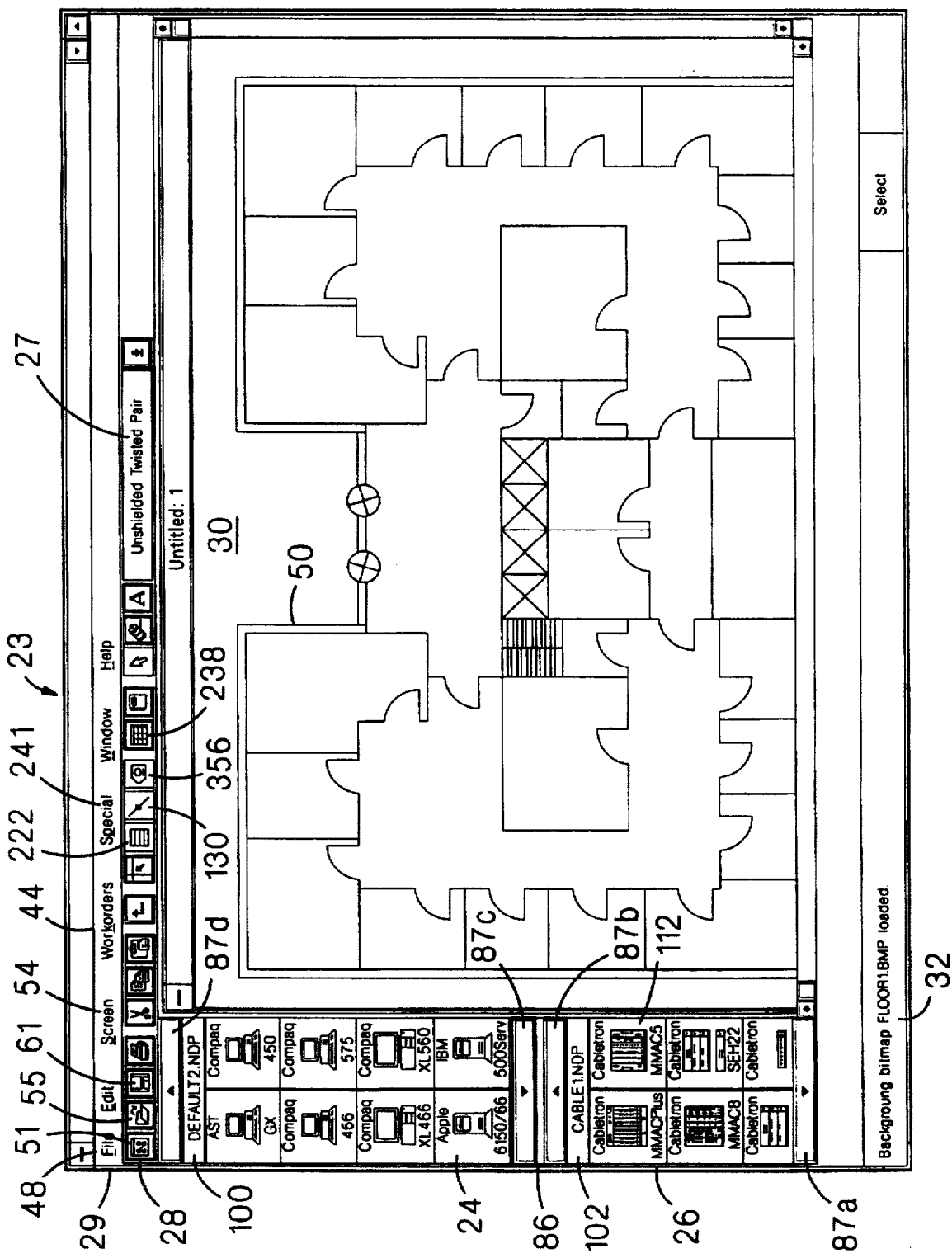
FIG. 2 is a computer screen display of a network design application window.

When loaded, a NetSuite Professional Design™ icon appears in a Netsuite Professional Design™ program group on the video display screen. To execute the network design software, the user double clicks on the design icon and the network design software causes the video display screen to display a main application window 23 (FIG. 2). The main application window includes device palettes 24, 26, a media pallet 27, a tool bar 28, a menu bar 29, a network design sheet 30, and a status bar 32.

Figure 3A:
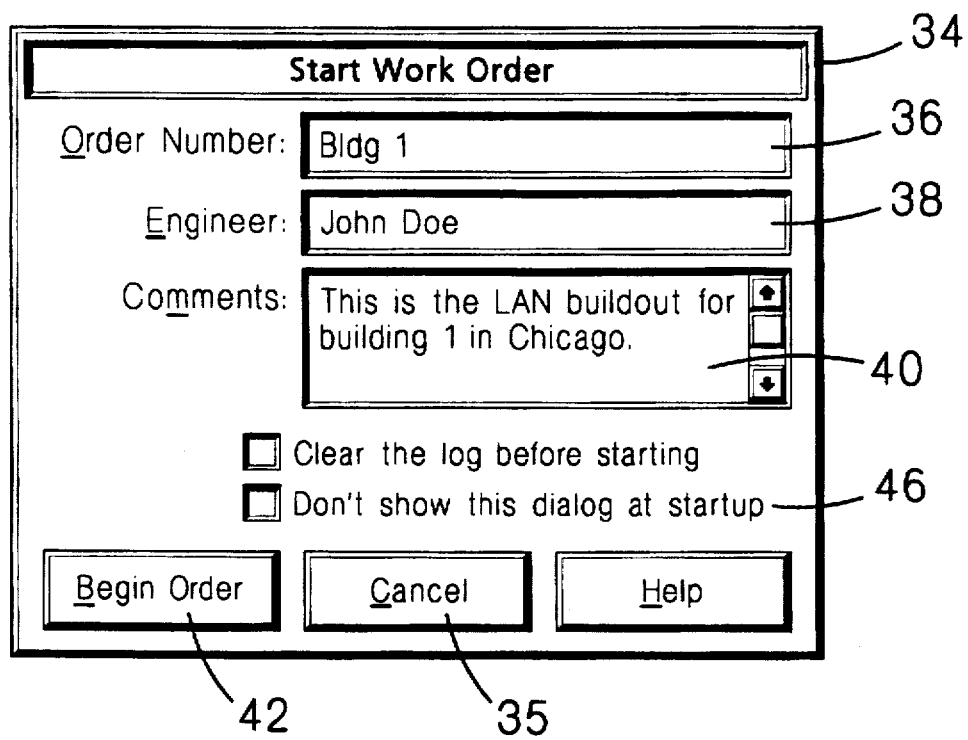
FIG. 3a is a computer screen display of a Start Workorder dialog box.

Each time the user begins a new network design or begins a session in which an existing design is modified, a work order dialog box 34 (FIG. 3a) is displayed. The user may move the cursor over Cancel box 35 and click the left mouse button of a mouse 39 (FIG. 1) to cancel out of the dialog box, or the user may enter a work order number or name in an Order Number box 36, the user's name in an Engineer box 38, and comments in a Comment box 40. The user then moves the cursor over the Begin Order box 42 and clicks the left mouse button to start the network design session.

Figure 3B:
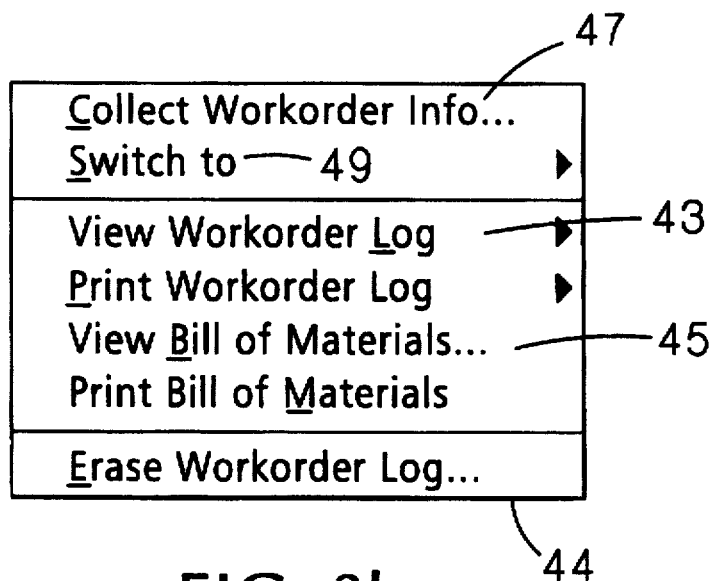
FIG. 3b is a computer screen display of a Workorder menu.
Figure 3C:
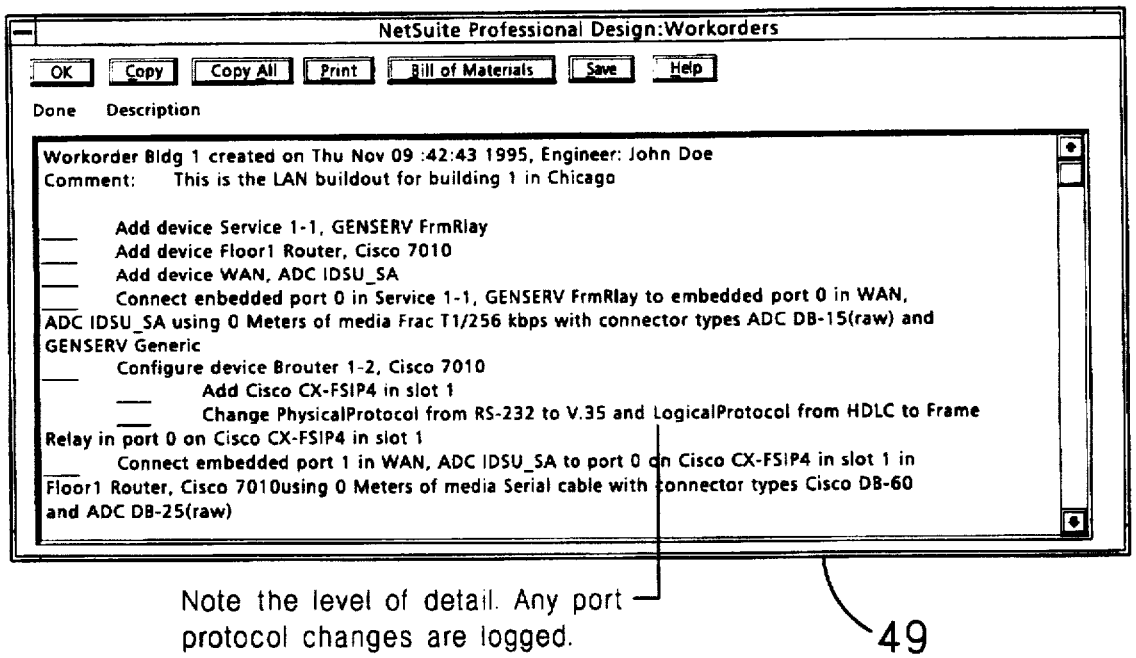
FIGS. 3c and 3d are computer screen displays of workorder logs.
Figure 3D:
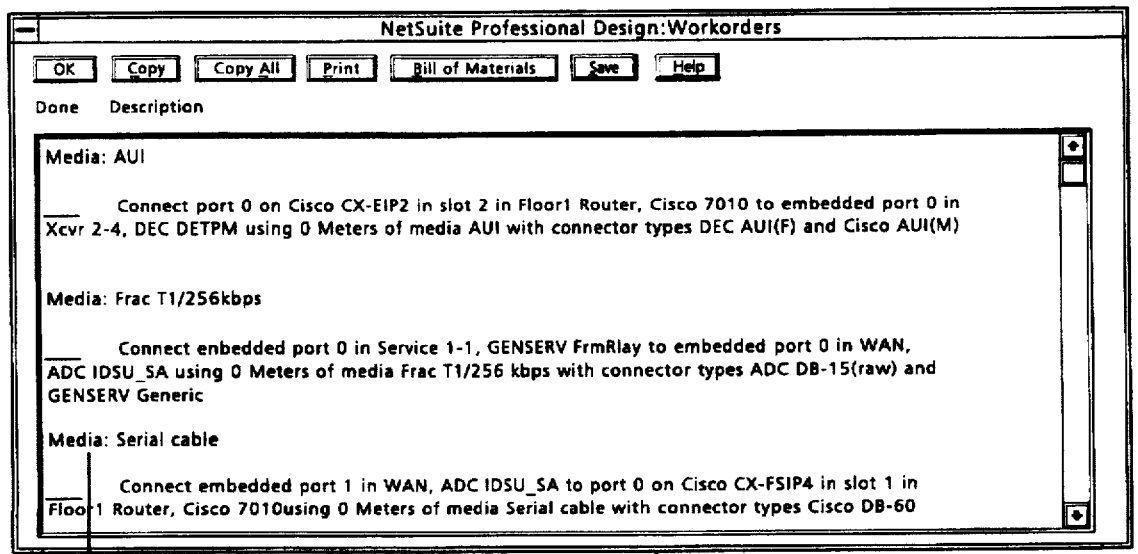

During the network design session, information necessary to build the network is logged in a work order log and a Bill of Materials (BOM) log which may be viewed by selecting a View Work order Log option 43 (FIG. 3b) or a View Bill of Materials option 45 from a Work order menu 44. A work order typically details the steps used to build the network, and includes information on the device and media categories used in a design. A BOM focuses more on the procurement of parts, for example, manufacturer, product type, and part number. The user selects whether to view the work order's details or BOM's details by time entered, order number, engineer name, device name, media name, or entry type. For example, FIG. 3c shows a work order log 49 sorted by time entered, and FIG. 3d shows a work order log 51 sorted by media name. FIG. 3e shows a BOM log 53.

The user may select a Don't show this dialog at startup option 46 (FIG. 3a) to prevent the workorder dialog box from appearing each time the network design software is executed. The user may select a Collect Workorder info. option 47 (FIG. 3b) or a Switch to option 49 in the Workorder menu to begin a new workorder log at any time during a design session.

Figure 4:
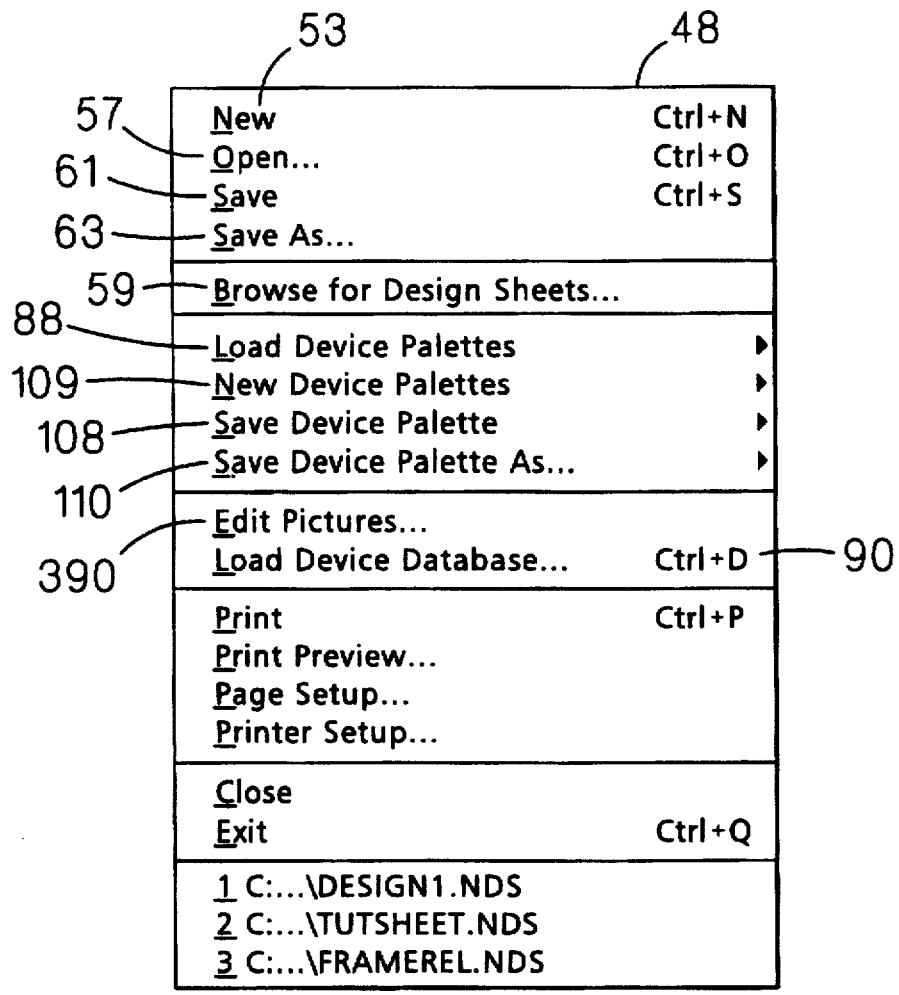
FIG. 4 is a computer screen display of a File menu.

Referring to FIGS. 2 and 4, when ready to begin, the user may choose to work on a new network design or an existing network design. Network designs are saved as design sheets. To work on a new network design the user may click on a new toolbar button 51 or may select a New option 53 from a File menu 48. To work on an existing network design, the user may click on an open toolbar button 55 or select an Open option 57 in the File menu. An open dialog box appears (not shown) and the user types in the name of an existing network design sheet. The user may browse the computer's hard drive for available design sheets by selecting a Browse for Design Sheets option 59 in the File menu, and the user may save a design sheet using a save toolbar button 61 or a Save option 61 or a Save As option 63 in the File menu.

Figure 5:
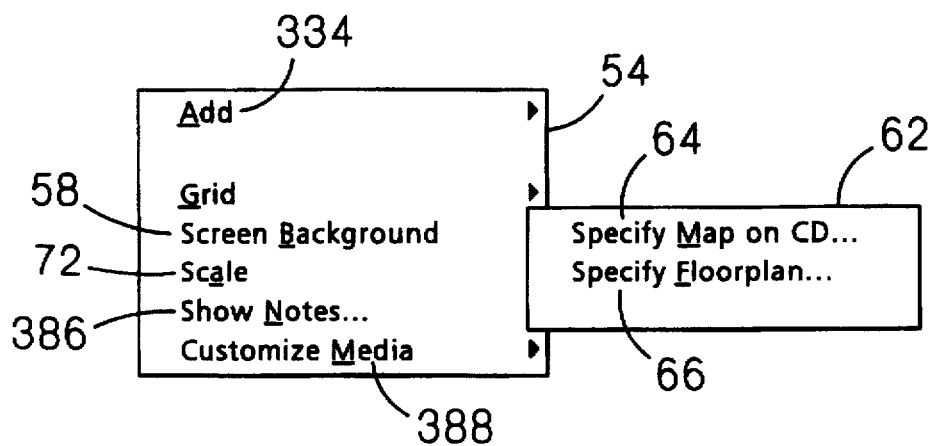
FIG. 5 is a computer screen display of a Screen menu.

Referring also to FIG. 5, the user may select a background, for example, office layout 50 (FIG. 2), for display in a design sheet by first selecting Screen menu 54. The Screen menu may also be displayed by moving the cursor over the design sheet and clicking the right mouse button. The Screen menu includes a Screen Background option 58 which, when selected, causes additional options 62 to be displayed, including a Specify Map on CD option 64 and a Specify Floorplan option 66. Selecting the Specify Map on CD option causes a list of predefined maps stored in background maps 16 to be displayed. The predefined maps include sample building floorplans as well as world and country maps. The user may move the cursor over the desired background and click the left mouse button to cause the network design software to display the selected background on the design sheet. After selecting the Specify Floorplan option, the user types in the file name of a user generated bitmap (.bmp), metafile (.wmf), or DXF file (interchange format for CAD tools, e.g., AutoCAD) to cause the network design software to import a user defined floorplan which may reflect an actual building/office blueprint.

Figure 6:
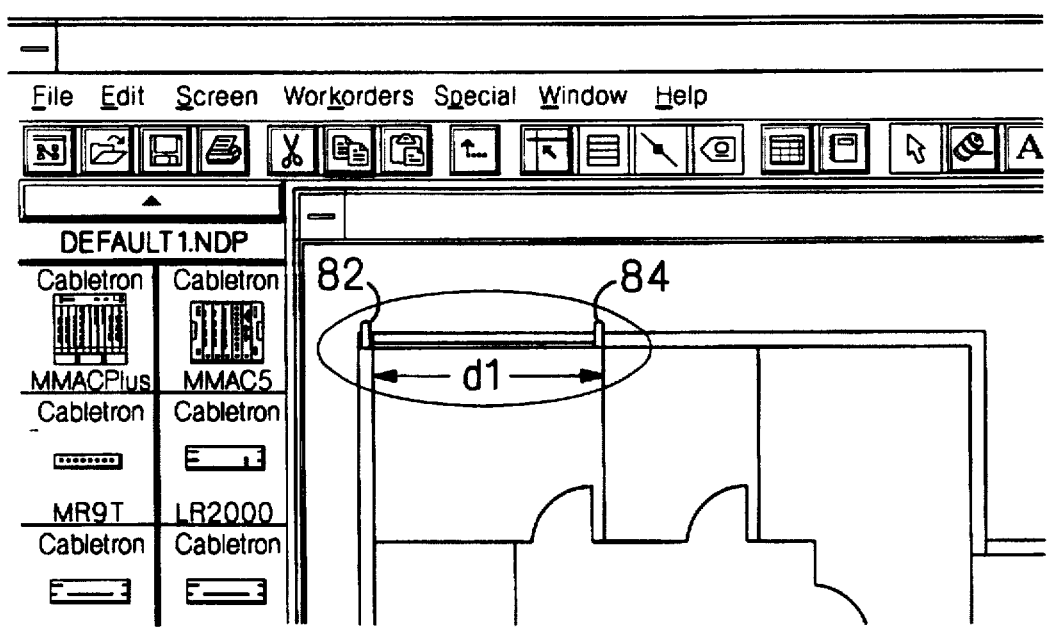
FIG. 6 is a computer screen display of a measured portion of an office layout.
Figure 7:
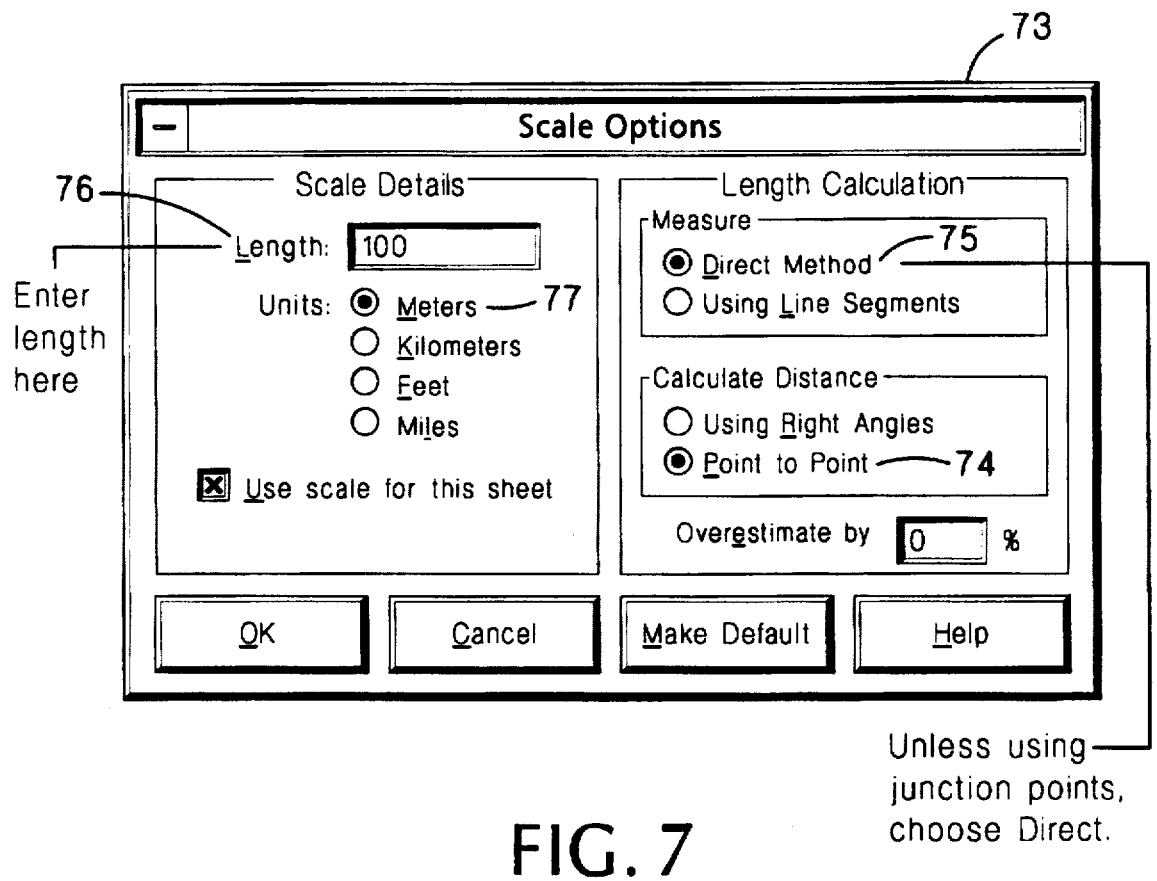
FIG. 7 is a computer screen display of a Scale Options dialog box.

Referring to FIGS. 6 and 7, the user may then specify a scale for the background to allow the network design software to indicate required cable lengths in work orders and bills of materials and to validate network parameters such as media length and distance between repeaters against network standards; for example, IEEE specifications. To specify a scale, the user selects the Screen menu (FIG. 5) or clicks the right mouse button while the cursor is over the design sheet. The user then selects a Scale option 72 and an Add Scale option (not shown). A Scale Options dialog box 73 appears, and the user may elect to calculate a distance between two points by selecting a Point to Point option 74. The user may then select a Direct Method option 75 and specify a length 76 as 100 meters 77. The user then moves the cursor to a first position 82 on the background, clicks the left mouse button, drags the cursor a distance d1 to a second position 84 on the background, and clicks the left mouse button. The network design software uses this distance to calculate the other dimensions of the office layout. Points 82 and 84 may be placed on empty areas of the background.

Referring again to FIG. 2, device pallets 24, 26 are working subsets of the devices available from device database 14 (FIG. 1). The device database is a relational database of templates that represent objects including personal computers (PCs), routers, hubs, switches, transceivers, adapter cards, and other device categories. The device icons correspond to intelligent objects built from the templates stored in the device database. Templates define rules for object instantiation such that each instantiation accurately reflects the characteristics of the corresponding network device. In accordance with the manufacturer's specifications, the device objects model the functionality of the corresponding network devices, including physical properties, port and slot types, available adapter card options, and asset management. For example, a Cisco AGS+ multiprotocol router object (not shown) behaves like the real AGS+, including the CBUS/Multibus dual bus scheme and the multiple protocols found on its adapter cards. As another example, the Cabletron MMAC-5 hub object 112 includes the correct number of FNBMGT and FNBMIM bus slots and two embedded console ports. Device objects may also include technical notes and photographs of the corresponding devices.

When the network design software is executed (i.e., the user double clicks on the Netsuite Professional Design™ icon), two default device palettes are displayed in the main application window. One default device palette includes network-specific devices, for example, routers, hubs, and switches, while the other default device palette includes non-network-specific devices, for example, servers and workstations. Palette splitter bar 86 may be dragged up or down with the mouse to show more of either the top or the bottom palettes. The user may scroll through devices in a palette that are not currently displayed using scrolling arrows 87a–87d.

Figure 8:
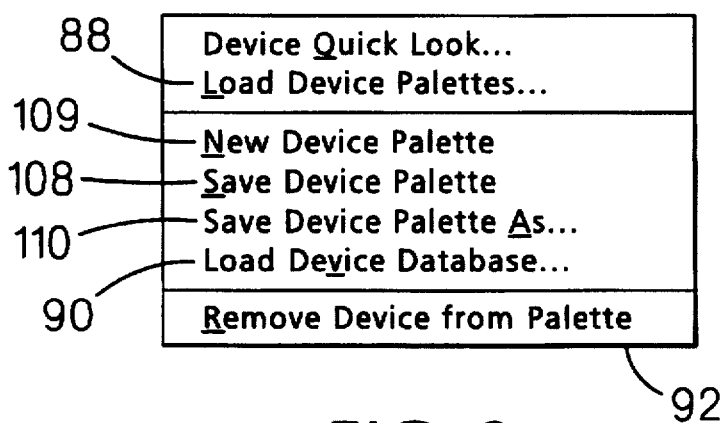
FIG. 8 is a computer screen display of a device palette pop-up menu.

To load a new device palette file into either the top or bottom device palette locations, the user begins by displaying a list of palette files. To display the list, the user may 1) select a Load Device Palettes option 88 (FIG. 4) from the File menu and then choose a Top Palette option or a Bottom Palette option, 2) move the cursor over either the top or bottom palette, click the right mouse button to cause a device palette pop-up menu 92 (FIG. 8) to appear, and select Load Device Palettes option 88, or 3) move the cursor over either button 100 or 102 at the top of each device palette and click the left mouse button. Once the list of palette files is displayed, the user selects one of these files by placing the cursor over the file and clicking the left mouse button. The network design software then loads the corresponding device palette.

The user may begin the generation of a network design by dragging network devices from the displayed device palettes onto the network design sheet (i.e., drag-and-drop technology), or the user may load the device database and drag-and-drop devices from a list of devices stored in the device database directly onto the design sheet. To load the device database, the user selects a Load Device Database option 90 from the File menu (FIG. 4) or from the device palette pop-up menu (FIG. 8) or presses Ctrl-D, and selects a Load Device Database option 94. Loading the device database causes a list 111 (FIG. 9) of vendors to be displayed. The list is arranged alphabetically by vendor name 96, 97, 98. To retrieve a list of device model names 99 from a particular vendor, the user moves the cursor over the plus sign [+] 104 associated with the vendor name and clicks the left mouse button. Next to each device model name, the device category 106 is listed in parentheses.

Figure 10:
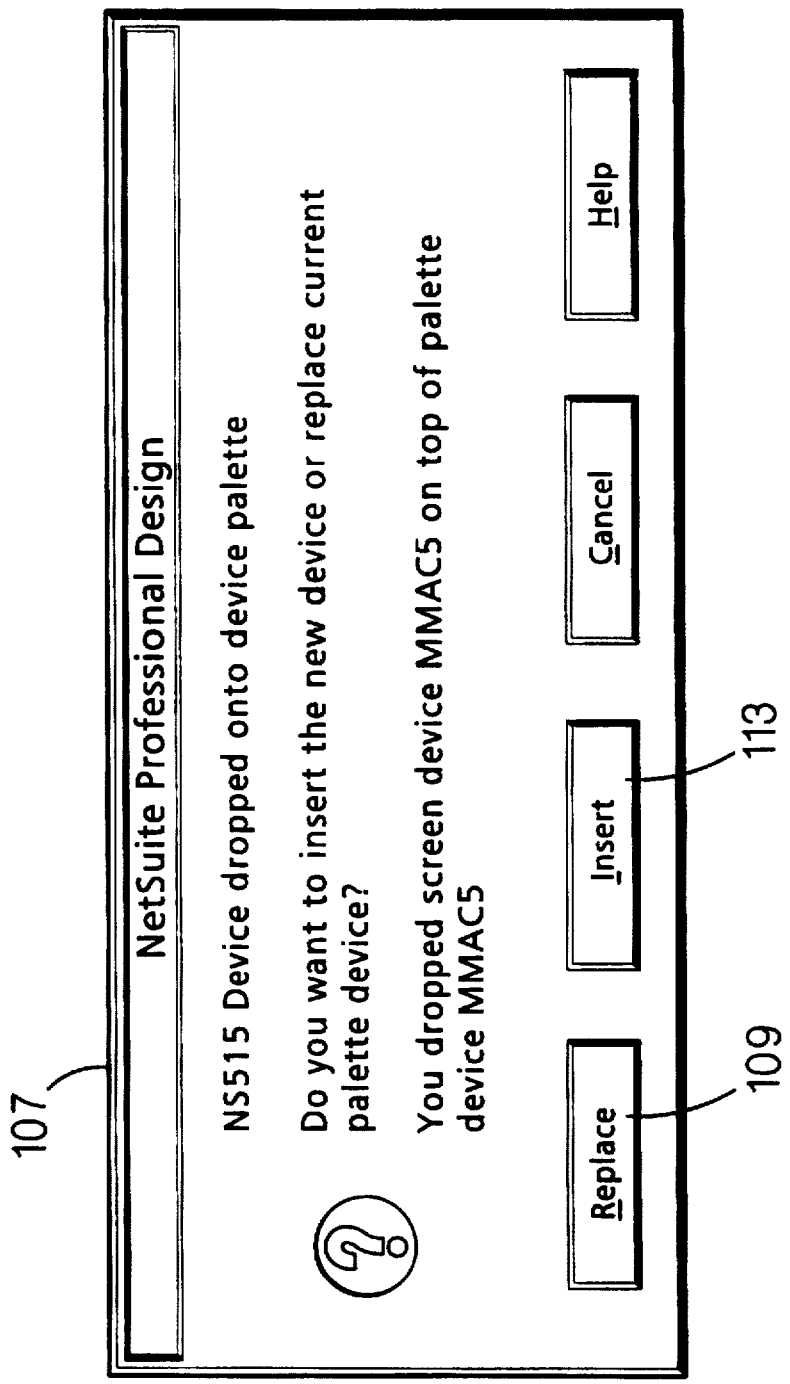
FIG. 10 is a computer screen display of a device palette pop-up menu.

Once the list of devices is displayed, the user may drag a device directly from the list to the design sheet or the user may generate a custom device palette by dragging devices from the list to a device palette. The user may modify an existing device palette, by loading the existing device palette and then dropping a device onto the palette. When a device is dropped onto a device palette, a palette pop-up menu 107 (FIG. 10) appears, and the user selects a Replace option 109 to replace the device onto which the new device was dropped with the new device or the user selects an Insert option 113 to add the new device to the palette without erasing any other devices. The user may save the modified device palette under the same device palette name by selecting a Save Device Palette option 108 from the File menu (FIG. 4) or the device palette pop-up menu (FIG. 8), or the user may save the modified device palette under a different name by selecting the Save Device Palette As option 110 and typing the new device palette name into the dialog box that appears. Similarly, the user may generate a new device palette by selecting the New Device Palette option 109 from the File menu or the device palette pop-up menu, dragging-and-dropping devices from the device database list onto the new device palette, and then saving the new device palette into a device palette file.

Grouping devices into custom device palettes may save time and memory space. The user may group devices that are most representative of the devices to be used in a particular site into one or more device palettes. The particular device palettes may be grouped into device type palettes, such as a hub palette that contains hubs from different manufacturers, or into manufacturer palettes, such as a Cabletron device palette containing only Cabletron MMAC hubs. A custom device palette may hold standard or "approved" devices or configurations, and VARs, system integrators, and sales engineers may generate a device palette for each customer.

Figure 11:
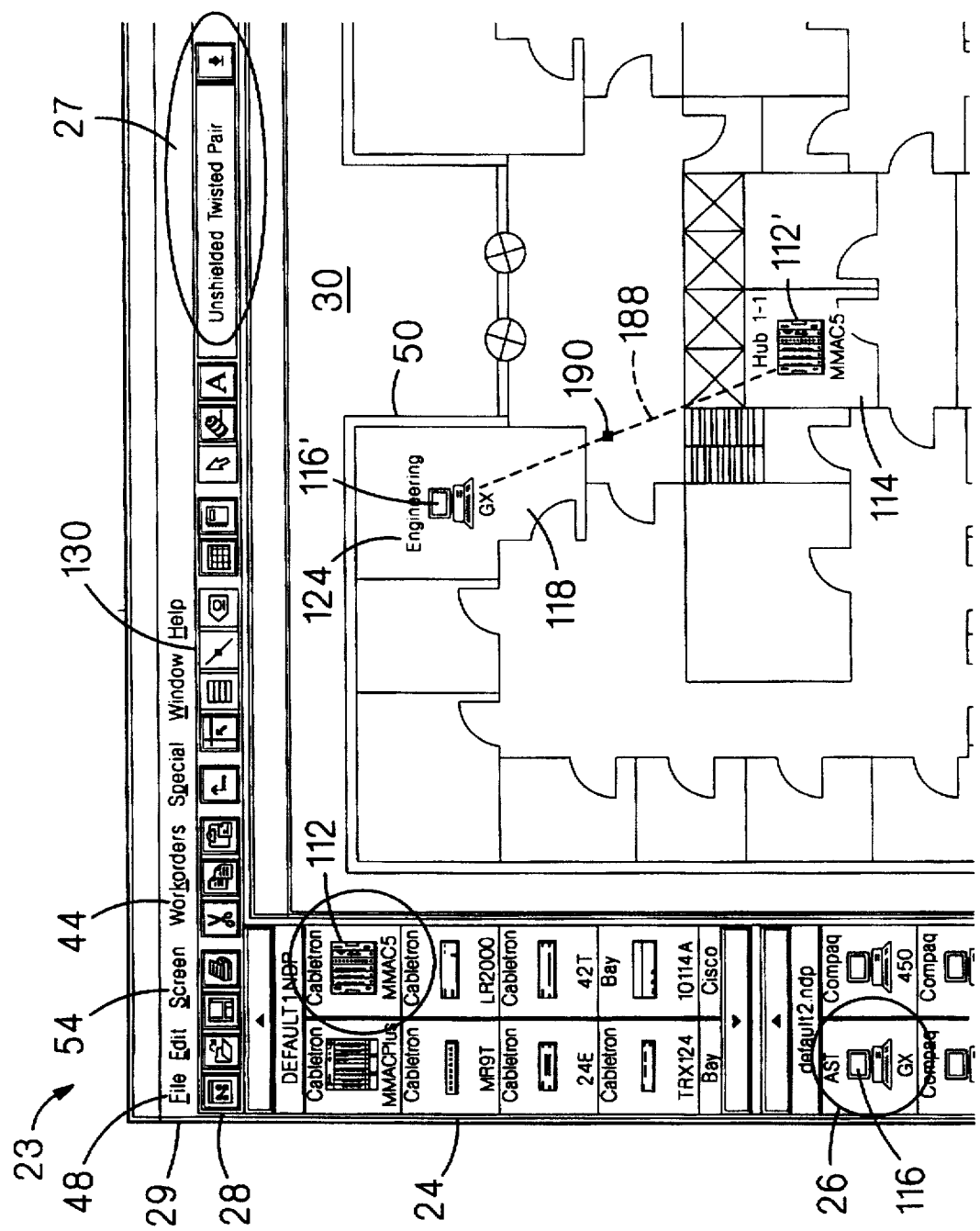
FIG. 11 is a computer screen display of a network application design window including a simple two device network.

Referring to FIG. 11, in one example of a network design, a Cabletron MMAC5 Hub 112 is selected from the upper right hand corner of device palette 24 (or from the device database list 111, FIG. 9), dragged to a room 114 in the center of floorplan 50, and dropped as Cabletron MMAC5 Hub 112'. The user then selects an AST GX PC 116 from the upper left corner of device palette 26, drags the device to a room 118, and drops the device as AST GX PC 116'. The device objects corresponding to icons 112' and 116' are instantiated on the design sheet by the network design software according to the templates stored the device database. As a result, the instantiated device objects accurately reflect the characteristics of actual network devices.

To make design sheets and workorders more readable, devices may be named. For example, the user moves the cursor over PC 116', clicks the left mouse button to cause a device pop-up window 120 (FIG. 12) to be displayed, selects a Name option 122, and types a name, e.g., "Engineering" 124. The name may represent the company division to which PC 116' belongs (i.e., Engineering vs. Finance).

Figure 13A:
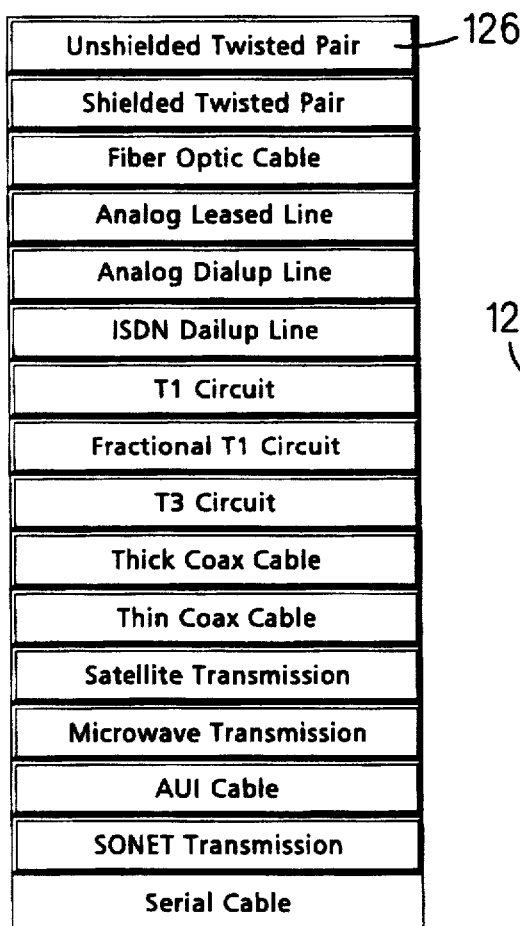
FIGS. 13a and 13b are computer screen displays of a media palette.
Figure 13B:
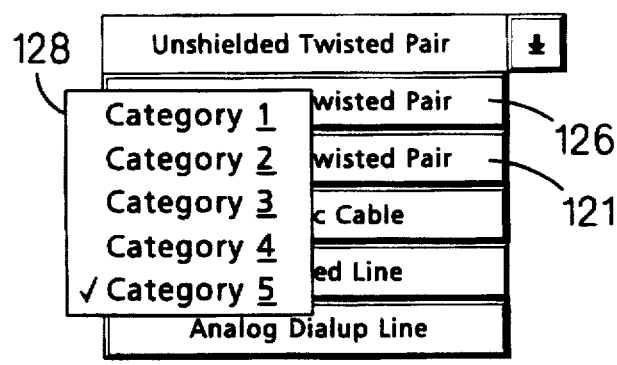

When the user is ready to connect PC 116' and hub 112', the user moves the cursor over media palette 27 and clicks the left mouse button to pull down media palette 121 (FIGS. 13a and 13b). The user scrolls through the list of available media types and selects "Unshielded twisted pair" 126 (UTP) media. The list of media types relate to intelligent objects stored in the device database which include relevant properties; for example, the length and cable grade of an unshielded twisted pair link between two Ethernet devices. When a media type includes a subcategory and is selected, a menu appears from which the user selects a particular category. For example, unshielded twisted pair wiring has five grades of wiring; the higher the wiring grade, the better the cable. When "Unshielded twisted pair" 126 is selected a sub category window 128 displays the five grades of wiring. In this example, the user selects category 5 which corresponds to the highest wiring grade.

The user may begin connecting two devices by either 1) moving the cursor over a Connect Mode toolbar toggle button 130 (FIG. 11), clicking the left mouse button, moving the cursor over one of the devices, and clicking the left mouse button or 2) moving the cursor over a device, e.g., PC 116', clicking the right mouse button, and selecting a Connect option 132 (FIG. 12) from device pop-up menu 120. In both cases, the cursor appears as cross hairs attached to a movable line representing a connection.

Figure 14A:
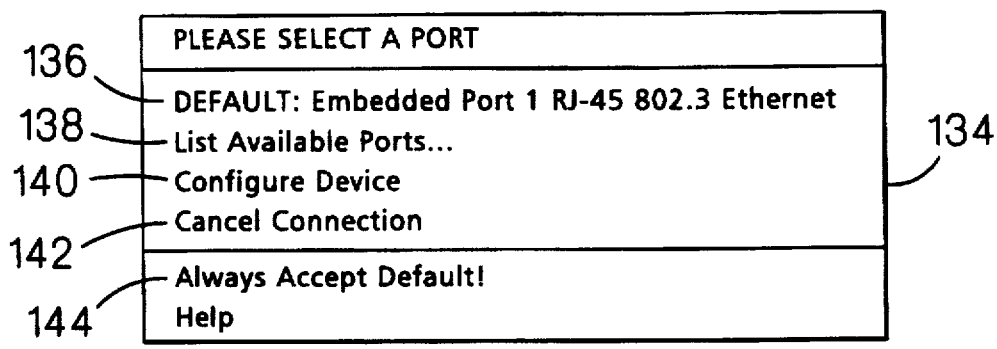
FIGS. 14a–14c are computer screen displays of connection message boxes.

Using the information stored in the device database, the network design software determines whether the connection is valid. If the network design software does not detect an error, then a Select A Port message box 134 (FIG. 14a) is displayed. The user may select a Default Port option 136 or another port by selecting a List Available Ports option 138. The user may also configure the device by selecting a Configure Device option 140 or cancel the connection by selecting a Cancel Connection option 142. If the user always wants to connect to the default port of devices, the user may select an Always Accept Default option 144.

Figure 14B:
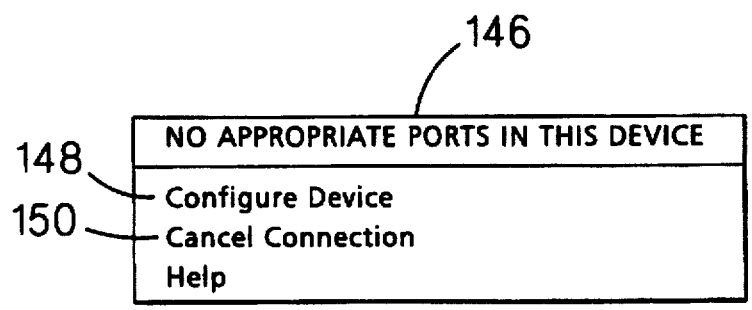

If the network design software detects an error, then an error message box is displayed. For example, if the device does not have enough free ports, then a No Appropriate Ports In This Device message box 146 (FIG. 14b) appears. The user may configure the device (described below) with an available port by selecting a Configure Device option 148, or the user may cancel the connection by selecting a Cancel Connection option 150.

Figure 15A:
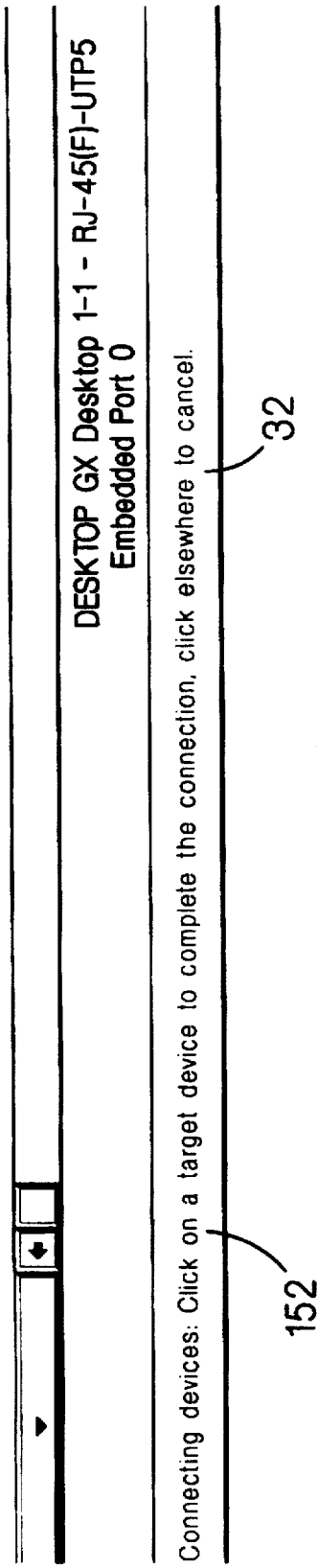
FIGS. 15a and 15b are computer screen displays of a status bar.

While generating a network design, the network design software updates status bar 32 with context-sensitive information to assist the user. For example, after connecting to PC 116', the status bar indicates that a connection has been started and that the user should "click on a target device to complete the connection, click elsewhere to cancel" 152 (FIG. 15a).

To connect to a target device, the user drags the connection to the target device, e.g., hub 112'. A traffic light metaphor is used to indicate the status of connections. If the target turns green, then the network design software has determined that the device can accept the connection and the user need only click the left mouse button to complete the connection. If the target turns red, then the device cannot accept the connection, and if the target turns yellow, then the device can accept the connection only after intermediate steps are taken. The intermediate steps may include configuring the device, changing the media type, and adding another device to the connection. If the user attempts to connect to a yellow target device, the network design software prompts the user to complete the necessary intermediate steps.

Figure 14C:
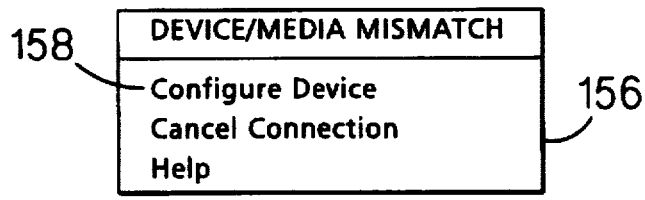
Figure 15B:
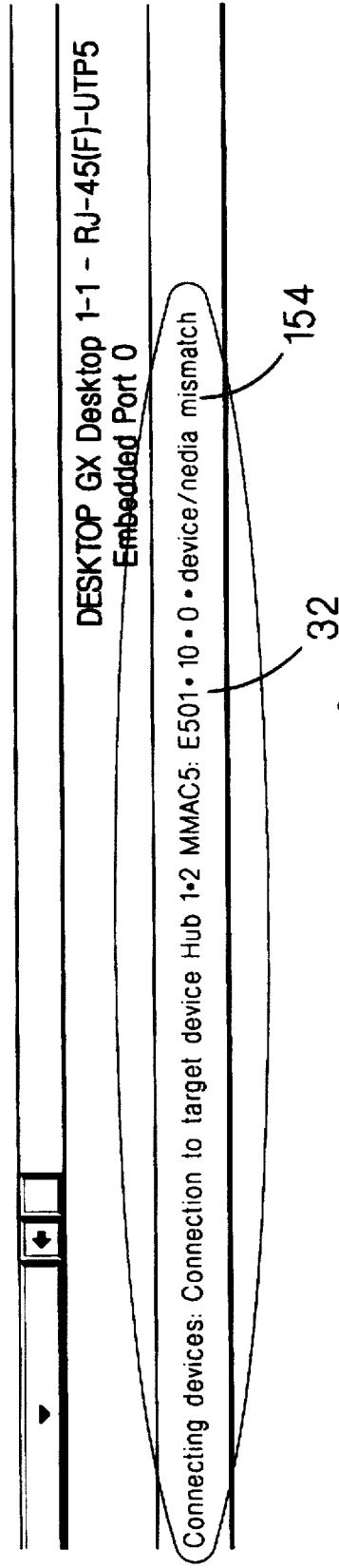

In this example, when the cursor is moved over the hub, the hub turns yellow and the status bar indicates a device/media mismatch error 154 (FIG. 15b). To continue with the connection, the user clicks the left mouse button while the cursor is still over the hub, and a Device/Media Mismatch error message box 156 (FIG. 14c) is displayed. The user selects a Configure Device option 158, and a Device Properties dialog box 162 (FIG. 16a) is displayed. The Device Properties dialog box pulls device information from the instantiated device object on the design sheet and, in a top window 164, indicates the slot details for the device including slot numbers, type, and current status. In the above example, the top window indicates that the hub has one management slot 166 (Cabletron FNBMGT slot) and five normal slots 168a–168e (Cabletron FNBMIM slots) and that all are unused.

Figure 16A:
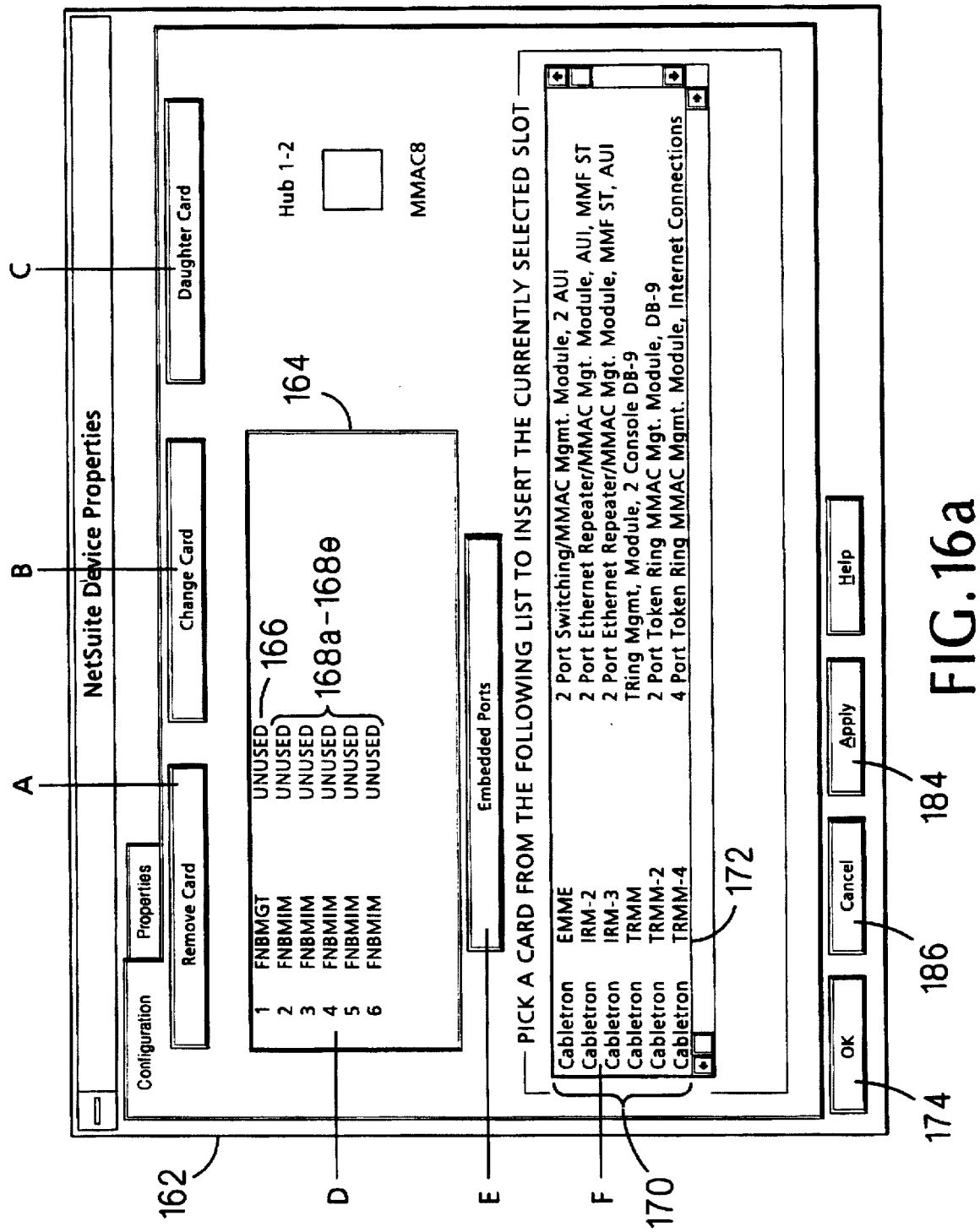
Figure 16B:
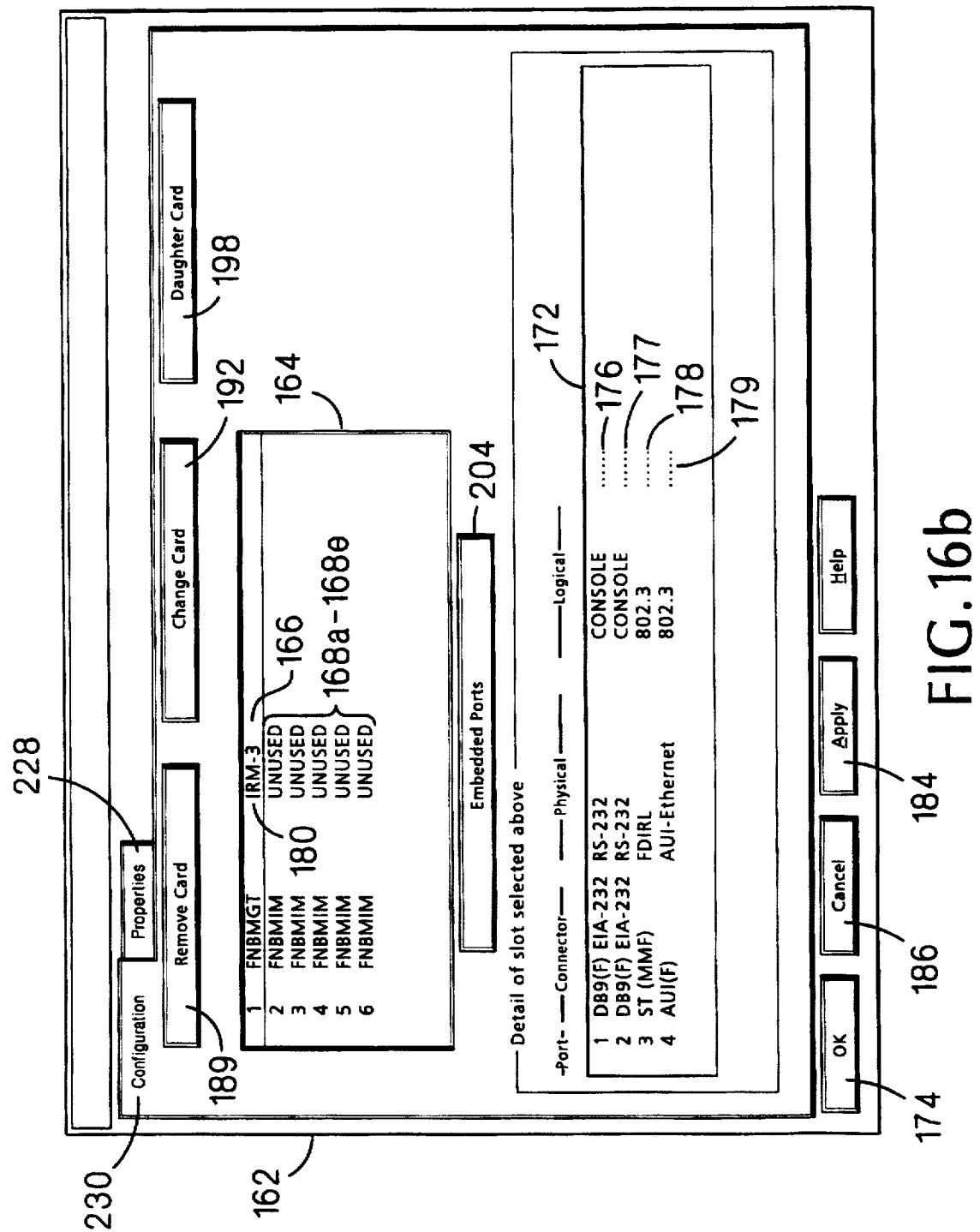
Figure 16C:
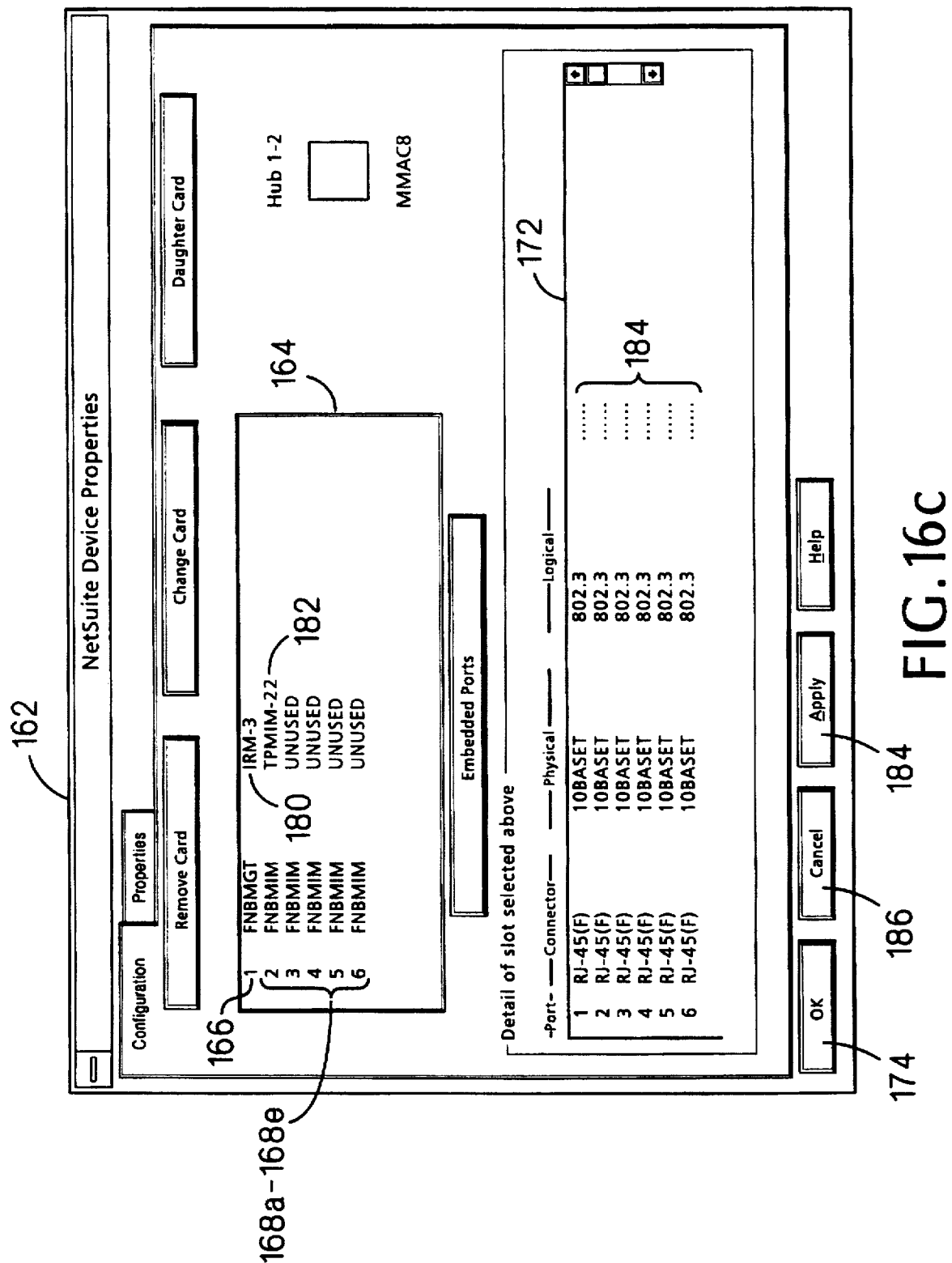
Figure 17:
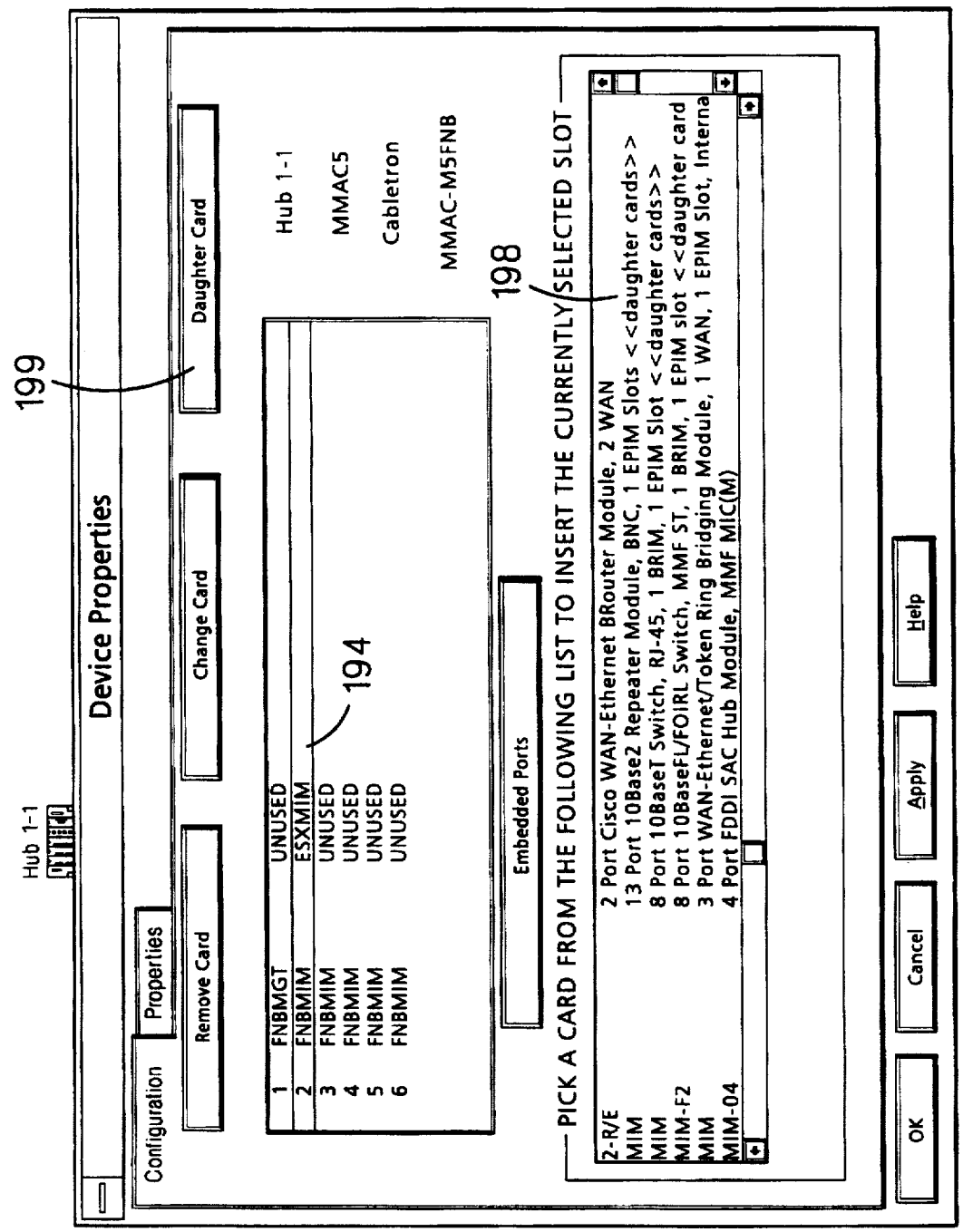
Figure 18:
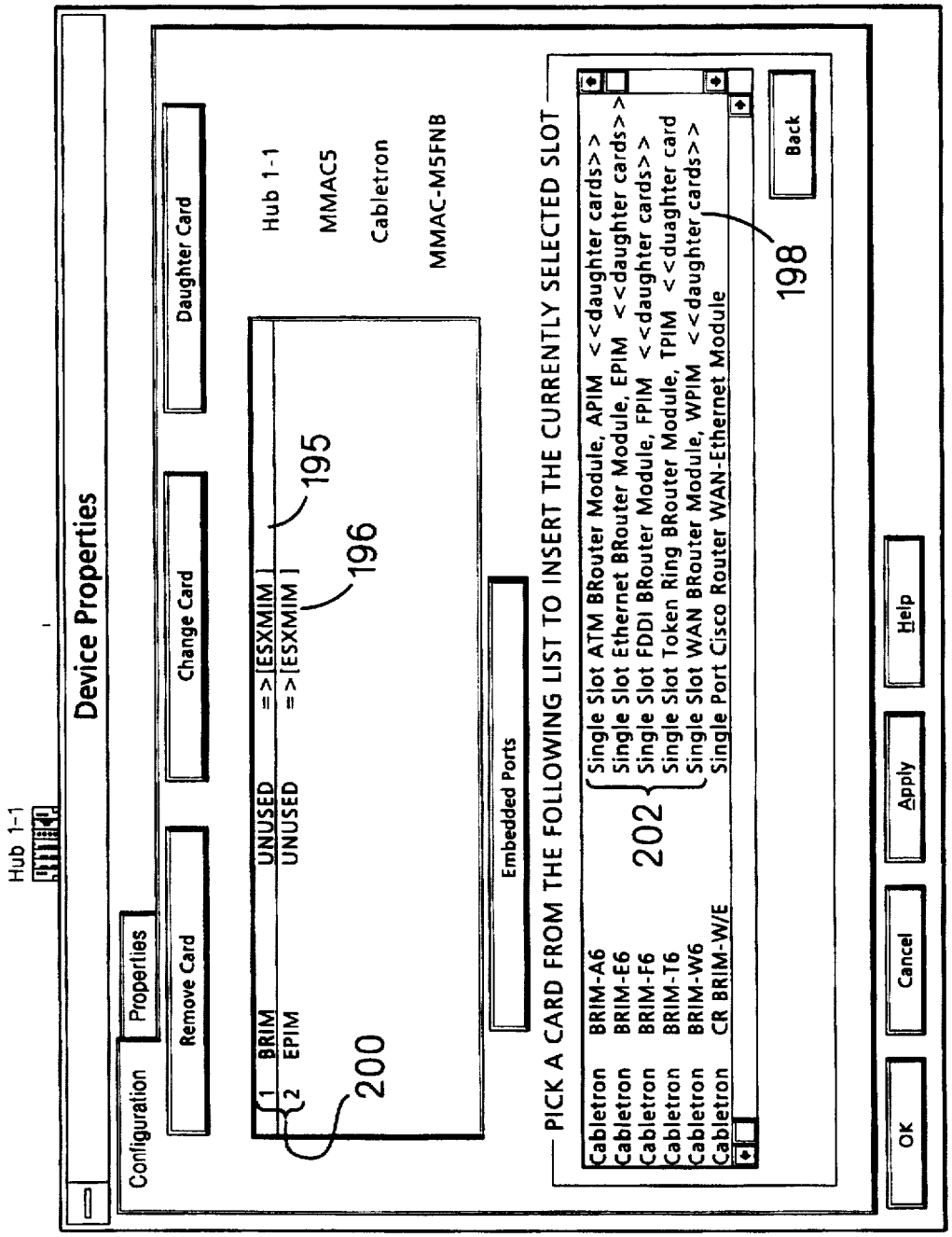
Figure 19:
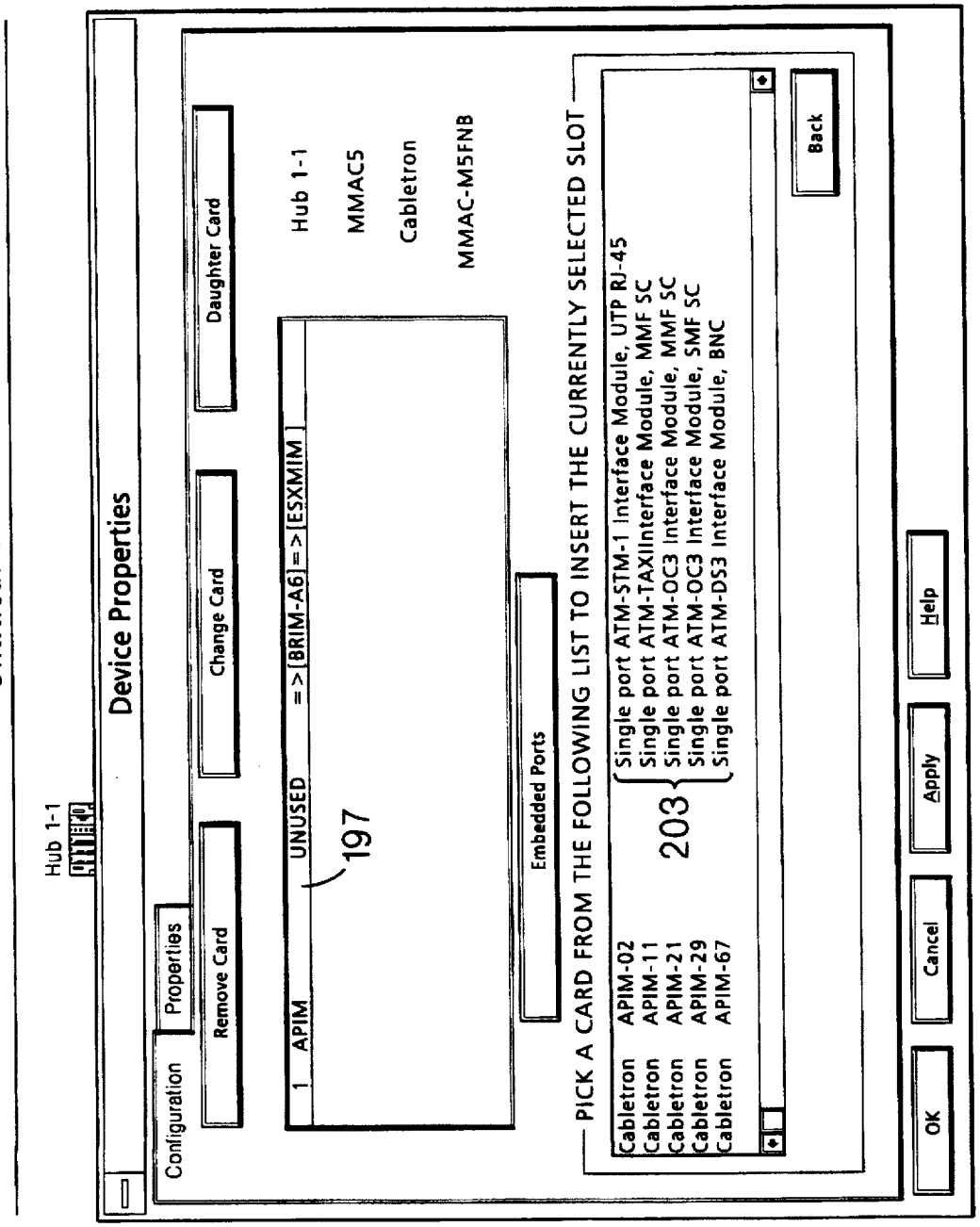
Figure 20:
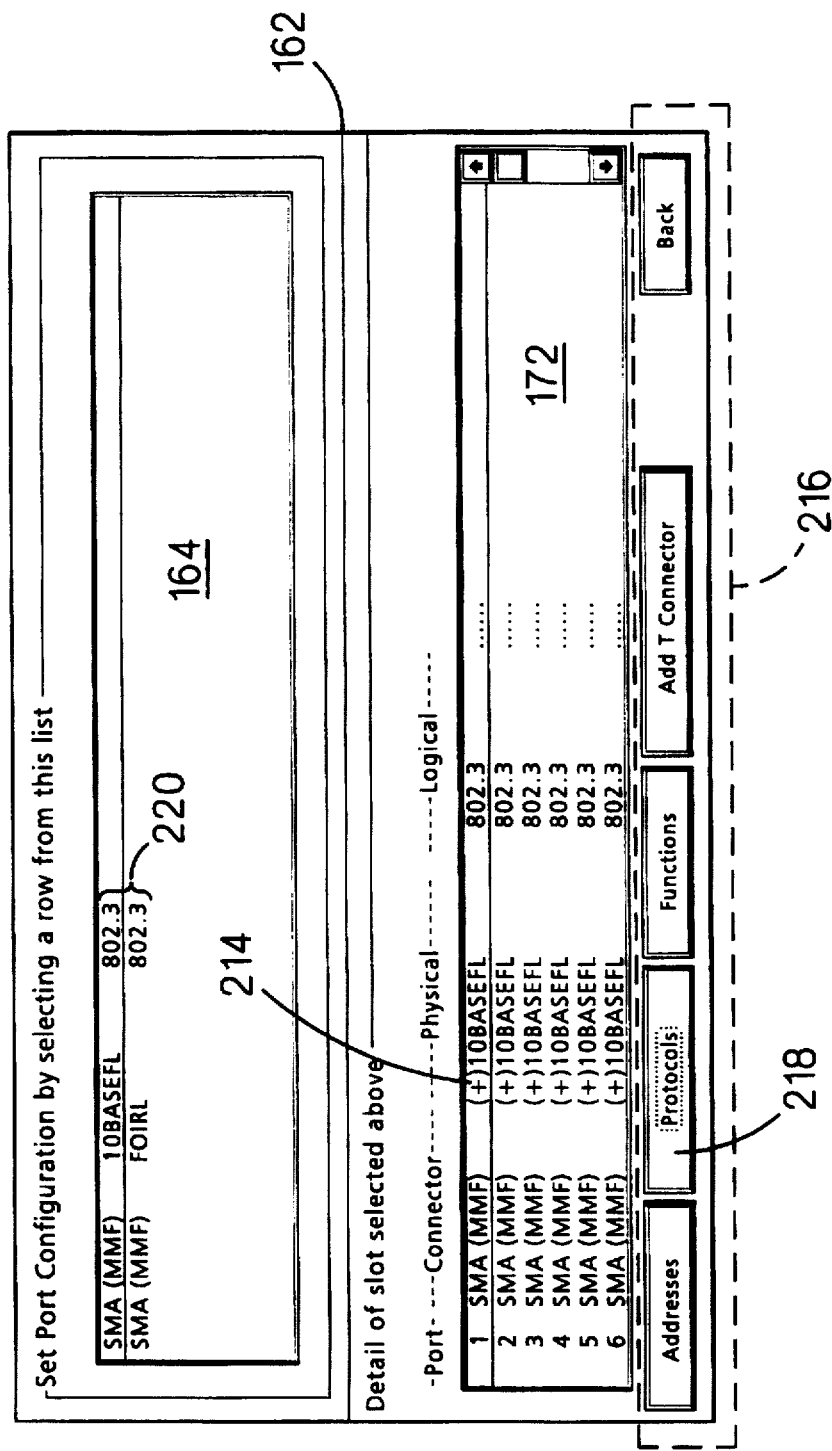

For devices which do not include any slots, the network design software displays a "no slots available" message in the top window and highlights the embedded ports button 204 (FIG. 16b). The user may select the embedded ports button to display the device's embedded ports in the bottom window. For instance, a Cabletron MR9T does not have any slots, and the network design software displays a list of the MR9T's nine embedded ports in the bottom window if the user selects the embedded ports button.

Cabletron MMAC devices require management cards to operate, and a concentrator card is needed to make a connection between the hub and the PC. To add a management card, the user moves the cursor over management slot 166 and clicks the left mouse button. A list of cards 170 that may be inserted into this management slot is displayed in a bottom window 172. The user may scroll through the list before moving the cursor over a card, clicking the left mouse button to select that card, and clicking an OK button 174. The bottom window then displays the selected card's embedded ports 176–179 (FIG. 16b). In this example, an IRM-3 Ethernet management module 180 is selected, and it includes 2 console ports 176, 177, one fiber port 178, and one AUI port 179.

The device database includes a template corresponding to each adapter card that may be inserted into a device slot. When the user configures a device with a card, the network design software uses the template to instantiate the card within the device object instantiation and to provide the list ports.

To add a card into slots 168a–168e of the hub, the user begins by selecting one of these slots. A list of cards (not shown) that may be inserted into this normal slot is displayed in the bottom window, and the user scrolls down the list and selects a card. In this example, a TPMIM-22 "12 port UTP RJ/45" card 182 (FIG. 16c) is selected, and the bottom window displays the card's embedded ports 184.

Because the list of cards for each port includes only compatible cards that may be inserted into the selected slot, the user is prevented from improperly configuring the hub. For example, the user cannot insert a TPMIM-22 card into the hub's management slot because this card is not provided in the list of cards from which the user may choose after the user selects the management slot.

After configuring the device, the user moves the cursor over Apply box 184 and clicks the left mouse button to accept the configuration changes made to the hub. Instead, the user moves the cursor over Cancel box 186 to cancel the configuration changes made to the hub.

If the configuration makes the connection possible, then the Select a Port message box (FIG. 14a) is displayed (unless the user previously selected the Always Accept Default option), and the user selects a connection port. The resulting connection 188 (FIG. 11) is displayed on the design sheet.

Referring to FIGS. 39–42, when the user attempts to connect two devices, the network design software may determine that one or more additional devices are required before the connection may be made. The network design software assists the user in adding the necessary devices (i.e., auto-instantiation). For example, the user may want to connect two Cisco routers 402, 404, that have been configured with AUI ethernet ports, over a long distance, for example, 500 meters. For such a long distance, the user selects the Fibre Optic media from the media palette, enters the connect mode, and clicks the left mouse button while the cursor is over (yellow) router 404. The network design software recognizes that the user is trying to connect these devices over a long distance (i.e., changing to the Ethernet UTP media would not make the connection valid) and, therefore, does not display the Device/Media Mismatch message box but, instead, displays an Add Multi-Mode Fibre To AUI Adaptor Unit message box 406. The user selects a Scan for necessary device option 408, and the network design software displays a Make a selection from the list box 410 including a list 412 of available devices that if added will permit the connection to be made.

In this example, the user selects a Cabletron FOT-F24 414 transceiver and clicks on an Accept button 416. The network design software then adds an icon 418 representing the FOT-F24 transceiver to the design sheet and completes a connection 420 between the FOT-F24 transceiver and router 404. The cursor remains as cross hairs with an attached movable connection line. The user drags the cursor to router 402 and clicks the left mouse button. Again, the Add Multi-Mode Fiber to AUI Adaptor Unit message box appears, the user selects the Scan for necessary device option, and selects the Cabletron FOT-F24 transceiver 414 from list 412. The network design software adds an icon 422 representing the FOT-F24 transceiver to the design sheet, completes a connection 424 between router 402 and transceiver 422, and completes a connection 426 between the two transceivers.

As previously mentioned, all changes to a network are tracked in an open workorder log and bill of materials. These changes include device and media additions and deletions as well as all device configurations.

Instead of configuring devices while trying to complete connections, the user may configure devices before attempting to connect them. For example, if a user intends to connect two Ethernet devices using fiber-optic media, the user may configure both devices with 10BaseFL cards before trying to connect them. Similarly, even after devices have been connected, the user may further configure the devices. The user begins by either moving the cursor over a device, clicking the right mouse button, and selecting a Configure Device option 160 (FIG. 12) from the device pop-up menu or moving the cursor over the device and double clicking the left mouse button. In either case, the Device Properties dialog box (FIG. 16a) is displayed.

Referring again to FIG. 16b, instead of adding cards in device slots, through the Device Properties dialog box the user may remove or change cards already added to device slots. To remove a card, the user selects the slot, e.g., slot 166, and clicks the left mouse button while the cursor is over a Remove Card button 189. The slot is now available to accept another card. To change cards, the user selects slot 166, clicks the left mouse button while the cursor is over a Change Card button 192, and selects a new card from the list of cards displayed in bottom window 172.

If the user attempts to change or remove a card having an active connection, the system displays a warning message. To change or remove the card, the user deletes the connection and then changes or removes the card. Any open workorder or bill of material is appropriately updated. Alternatively, if a card with an active connection is to be changed for a card with the same active connection, then the network design software permits the change if the new card has a compatible port. The network design software then appropriately configures the new card and updates any open workorder and/or bill of materials.

Particular adapter cards have slots into which one or more daughter cards (i.e., additional circuit cards) may be inserted. For example, the Cabletron ESXMIM card 194 (FIG. 17) contains two daughter card slots: a BRIM slot 195 (FIG. 18) which accepts a BRIM-06 bus card, and an EPIM slot 196 which accepts an EPIM bus card. The BRIM-06 daughter card includes a APIM slot 197 (FIG. 19) which in turn can accommodate an APIM-02 daughter card (sometimes referred to as a grand-daughter card). A <<daughter card>> 198 notation is listed with adapter cards having daughter card slots, and when a card having a daughter card slot is selected, a daughter card button 199 becomes active (highlighted).

To install daughter and grand-daughter cards, the user selects a card with the <<daughter card>> notation and clicks on the daughter card button. The network design software then displays daughter card slots 200 in the top window. The user selects one of the slots and a list of compatible daughter cards 202 is displayed in the bottom window. The user then selects one of the displayed daughter cards to install that daughter card. If the daughter card includes the <<daughter card>> notation, the user may install a grand-daughter card by repeating the above steps: selecting the daughter card, clicking on the daughter card button, selecting a grand-daughter card slot 197, and selecting a compatible grand-daughter card 203.

Using the Device Properties dialog box, the user may display a list of the device's embedded ports by clicking on an Embedded Ports button 204. These are the only ports that can accept connections if no adapter cards are installed. Some devices do not have embedded ports and, therefore, cannot accept connections until an adapter card is installed. For example, if a Cisco 1004 Ethernet bridge/ISDN router is double clicked on to bring up the Device Properties dialog box and the Embedded Ports button is clicked on, a list 206 (FIG. 19) of embedded ports is displayed including a 10BaseT port 208, an ISDN-BRI port 210, and an RS-232 console port 212.

Some ports are multi-personality ports which may be configured for use with a specific connector type, physical protocol, or logical protocol. On actual devices, a multi-personality port is configured through software provided by the manufacturer or through physical jumpers on the card. The network design software simulates multi-personality port configuration. A [+] notation 214 (FIG. 20) in a port description indicates that the port is a multi-personality port.

The network design software uses an internal sequence list to choose a port personality during a connection. The personalities rotate in the list according to the last one used. The network design software chooses the correct logical protocol for the target device even if the choice does not agree with the logical protocol currently being pointed to by the sequence. For example, if the user connects a DSU to a router using V.35 serial Frame Relay, the Frame Relay logical protocol is automatically selected regardless of the sequence (as long as the router has a compatible embedded port or an installed adapter card has a compatible port).

To select a physical protocol that is different from the physical protocol currently pointed to by the sequence, the user manually configures the port. For example, if a connection is made to a Cabletron FDMIM-16 10BaseFL/ FOIRL card while the sequence is pointing to the 10BaseFL physical protocol, then the port is configured by the network design software with the 10BaseFL physical protocol. To change the physical protocol to the FOIRL physical protocol, the user begins by selecting the FDMIM-16 card (not shown) in the top window of the Device Properties dialog box causing the list of ports to be displayed in the bottom window. The user then selects the multi-personality port, e.g., port 214, that the user wants to change. Selecting the multi-personality port causes the network design software to display a multi-personality port button bar 216. The user clicks on a Protocol button 218, and a list 220 of multiple personalities for the port is displayed in the upper window. The user selects the desired personality, and the network design software simulates changing the physical protocol on the actual port.

Figure 21:
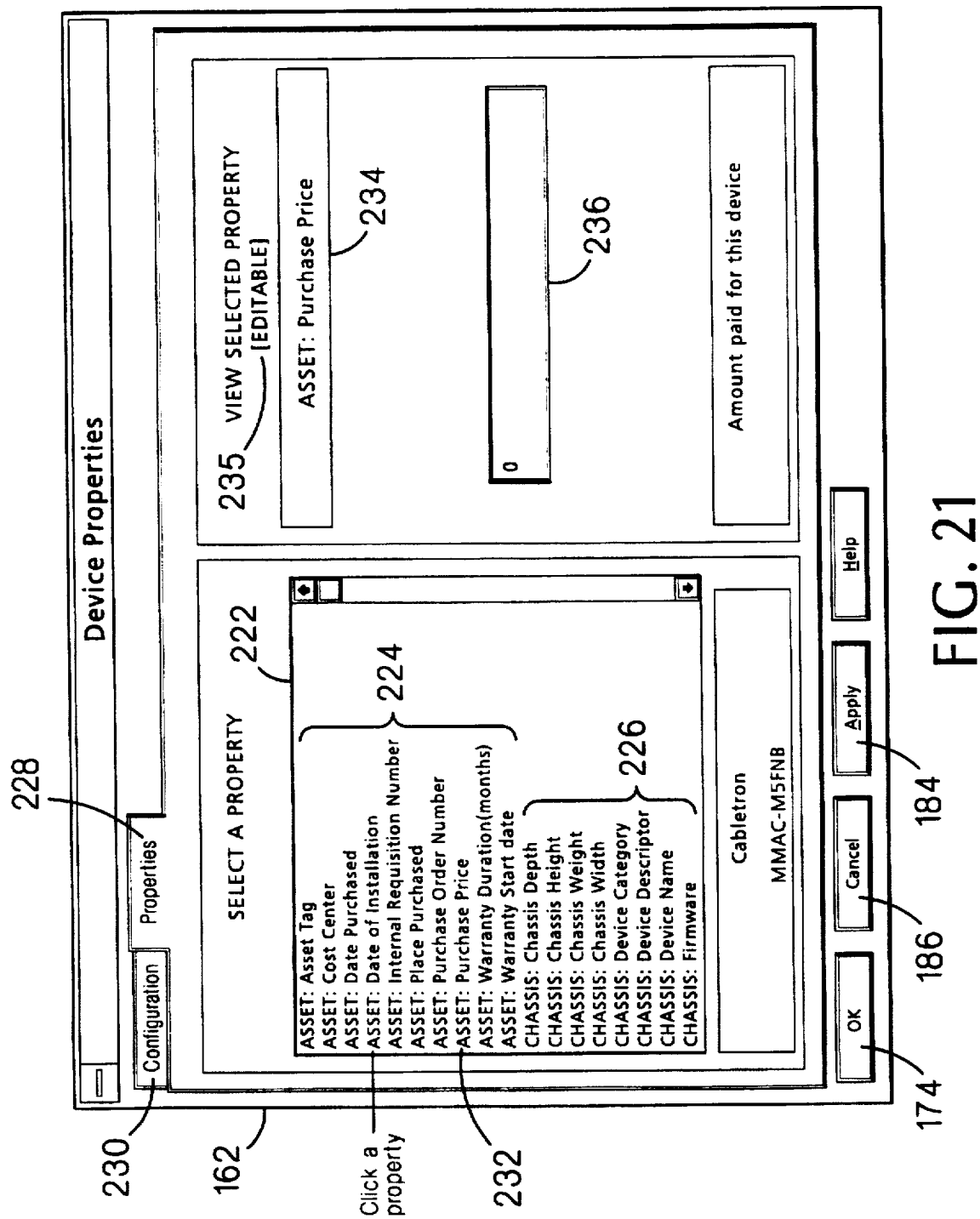

Referring again to FIG. 16b and also to FIG. 21, the user can view a list 222 of specific device properties, including asset tag information 224 and chassis information 226, by clicking on a Properties button 228. To return to viewing configuration fields, the user clicks on a Configuration button 230. Some device properties are editable while others are read-only. For example, the user may change IP addresses, warranty dates, prices, asset tags, device location, and installed memory but cannot change vendor specific information such as device category, chassis dimensions, number of ports and slots, and environmental specifications. When the user selects a property, e.g., ASSET: Purchase Price 232, from the list of device properties, the network design software displays the property information 234 and indicates whether the information is editable 235 or read-only. If the information is editable, the user may enter new property information in an entry box 236. The user saves the changes by clicking the OK or Configure buttons.

Referring back to FIG. 2 and also to FIGS. 22 and 23, the user may click on a Spreadsheet Mode toolbar button 238 to cause the network design software to display a Spreadsheet View Window 239 (Grid). Alternatively, the user may select a Spreadsheet Mode option 240 from Special Menu 241. The Grid displays device details in a table consisting of columns and spreadsheet-like cells giving the user a "bird's eye view" of the objects on the current design sheet. To display media details, the user clicks on a media toolbar button 242, and to return to viewing device details, the user clicks on a device toolbar button 244.

A top window 246 includes scrollable rows of cells having columns including Device Name 248, Manufacturer 250, and Part Number 252. The user may edit configurable fields by typing directly into the corresponding cell or by typing into an editing bar 254. Device properties such as slots and embedded ports are displayed in lower windows 256, 258, respectively, when the user selects a device in the top window and clicks on a Cards/Ports button 257. Clicking on a slot causes a Port Detail box (not shown) to appear listing that slot's ports and detailed information about each port. The user may bring up a Filter menu 259 and use the options in that menu (not shown) to filter the cells displayed in the upper window. For instance, the user may have only a particular vendor's devices displayed by filtering the cells according to that vendor's name, or the user may have only a particular category of devices displayed to filtering the cells according to that category.

Bottom button bar 260 allows the user to advance to corresponding grid cells. For example, clicking on a Software button 262 advances the user to grid cells pertaining to installed software, and clicking a Purchasing button 264 advances the user to cells pertaining to pricing. Clicking on a User Fields button 266 advances the user to ten customizable fields, where the user may define attributes, for example, phone numbers.

Devices displayed on the design sheet may be moved to different locations on the floorplan (compare FIGS. 11 and FIG. 24) using the drag-and-drop technique while connections between devices are maintained.

To examine the details of connection 188, the user moves the cursor over a red connection handle (square) 190 (FIG. 11) and clicks the left mouse button. Connection 188 is highlighted in yellow on the display screen and the status bar indicates 270 (FIG. 25) that the connection is an Ethernet connection over UTP-5 media between an MMAC-5 and a desktop PC. Port details are also displayed.

Instead, the user may bring up a Media Properties window 430 (FIG. 43) to view connection details. To do this, the user begins by selecting a media segment (188) by either moving the cursor over the connection, clicking the left mouse button (segment is highlighted in yellow), and selecting an Edit Media Details option 432 from the media pop-up menu or by double-clicking the right mouse button while the cursor is over handle 190. In either case, the Media Properties window is displayed. The Media Properties window includes four tabs containing configurable options: General tab 434, Connections tab 436, Length tab 438, and Addresses tab 440.

The General tab allows the user to define a media name (e.g., Frame Relay, Backbone Network, or AUI drop cable), description, and internal and external circuit identifiers. The Connections tab shows details about how the devices are connected to the media, including physical and logical protocols, ports used for the connections and if embedded, how the ports are configured (e.g., bridging, routing, repeating), if either device has a DTE or DCE property set, and if the port can provide or receive clocking. The Addresses Tab allows the user to add various addresses for the media connection. An address field for both devices is attached to the media. Information provided in the Address tab is displayed in the Spreadsheet View window (FIG. 22). A router button (not shown) is available in the Address tab window and is selectable if one of the devices connected to the media is a router. When the router button is selected, a Router Properties Box 442 (FIG. 44) is displayed within which a user may edit logical addresses, for example, Frame Relay, DLCI, or IP addresses. A Multiplexer button (not shown) is also available in the Address tab window and is selectable if one of the devices is a multiplexer. When the Multiplexer button is selected, a Multiplexer Properties Box (not shown) is displayed within which the user may edit physical properties, for example, framing D4/ESF or encoding (AMI or B8ZS). The Length tab allows the user to override the current scale for the design sheet and enter a media length 444 (FIG. 45) for the selected media segment.

Figure 12:
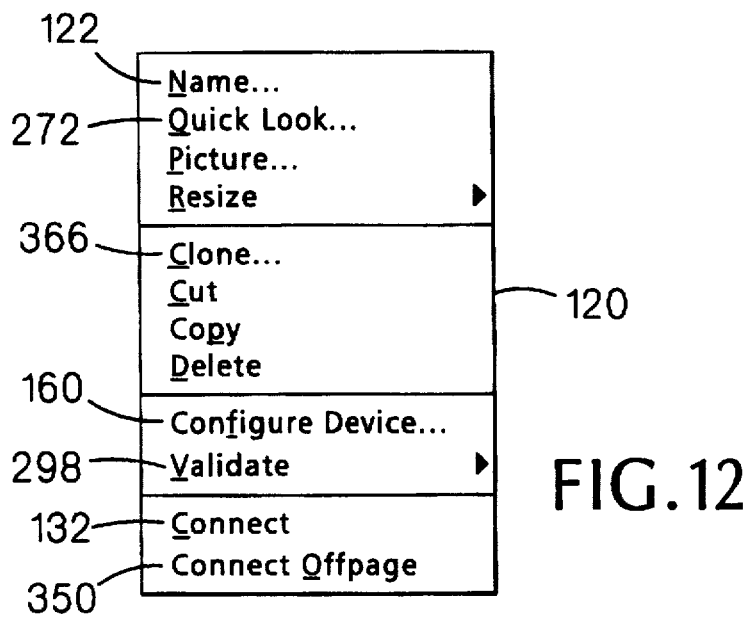
FIG. 12 is a computer screen display of a device pop-up menu.

To check device details, the user moves the cursor over the device, for example, hub 112', clicks the right mouse button, and selects a Quick Look option 272 (FIG. 12). A Quick Look window 274 (FIG. 26) appears that displays device information including device name 276, part number 278, manufacturer 280, and description 282. The user may move the cursor over the Show Ports button 284 and click the left mouse button to cause a status of the ports 286 (FIG. 27) to be displayed. For example, the status of the ports indicates that Slot 2 Port 1 is connected 288. This is the port connected to PC 116'.

With the Quick Look window displayed, the user can click on another device, for example, PC 116', and the Quick Look window is dynamically updated to display device information about device 116'.

The user may determine that a particular device configuration may be used repeatedly. To avoid having to reconfigure the base device each time the user adds the device to the network, the user may add a configured device to one of the device palettes. For example, after configuring hub 112', the user simply drags and drops the hub 112' onto device palette 24 over unconfigured hub 112. In the device palette pop-up menu (FIG. 10), the user selects the Replace option to replace unconfigured hub 112 or the Insert option to add hub 112' to the palette without erasing unconfigured hub 112. To save the modified palette, the user may select the Save Device Palette option from the File menu (FIG. 4) or from the device pop-up menu (FIG. 8), or the user may select the Save Device Palette As option and specify a new palette name.

Referring to FIG. 28, the user may bend media connections around the floorplan, for example, around offices and cubicles. The user begins by moving the cursor over connection handle 190 and clicking the left mouse button to highlight connection 188 in yellow. The user then clicks the right mouse button to cause a media pop-up menu 290 (FIG. 29) to appear and selects an Add Junction option 292. Alternatively, the user moves the cursor over the connection handle and simultaneously presses the Ctrl button and clicks the left mouse button. In either case, the user then moves the cursor to a location 294 (FIG. 28) where the user wants the connection to bend and clicks the left mouse button. A junction point 296 (empty circle) appears on connection 188 at location 294. The user may add multiple junction points to a connection.

To validate connection 188, the user moves the cursor over hub 112' or PC 116' and clicks the right mouse button.

The user then selects a Validate option 298 (FIG. 12) from device pop-up menu 120 and a Validate Ethernet option (not shown) from a list of options that appear when the Validate option is selected. (Because the only logical protocol running is Ethernet, the Validate Ethernet option is the only option available.) A Validate Results window 300 (FIG. 30) appears and notifies the user of any detected errors, e.g., failure 302 and description 304. The user may select a Technical Assistance button 306 to bring up a Design Error Message box 308 which displays that portion of the corresponding standard, for example, the Ethernet specification 310, that has been violated.

For example, devices and media connections may be grouped into collections (logical partitions) to simplify working with complex network designs. Physically, a collection is a design sheet. Multiple collections may be linked to each other via off-page connections between their corresponding design sheets. Each collection is represented as an icon when collapsed, and when the user double clicks the left mouse button on an icon, the design sheet corresponding to the icon is displayed in the application window. Referring to FIG. 31, the devices and media connect on each floor of an office building 326 are grouped into separate collections 320, 322, 324. The user imported a country map 328 and populated the country map with multiple building collections 326, 330, 332. The user may also import a world map and populate it with country collections (not shown).

Design sheets are hierarchical. The first new sheet the user begins with is the parent sheet and as collections are added, the sheet hierarchy grows. When a user opens an existing design, any embedded collections are also opened, and when a design sheet is saved, all collections associated with the parent design sheet are also saved.

When generating collections, the user may add an empty collection to the design sheet and then fill it with devices, or the user may collapse selected devices into a new collection. To generate an empty collection, the user selects an Add option 334 (FIG. 5) from the screen menu and then selects an Empty Collection option (not shown). A Create Empty Collection dialog box 336 appears, and the user types the name of the collection into entry box 338 and a description of the collection into entry box 340. The user then selects an icon from a list of icons 342 to represent the collection, and clicks on Accept button 344. Devices and connections are added to the collection when the user drags devices from device palettes or the list of devices in the device database and drops the devices onto the collection icon. Additionally, a user can add a device to a collection by dragging a device from a design sheet and dropping it onto the collection icon.

To generate a populated collection, the user selects the devices on the current design, for instance, by pressing the left mouse button and drawing a box/marquee around the devices, clicks the right mouse button, and selects a Create Collection option 346 (FIG. 33) from a marquee selection pop-up menu 348. A Create Collection dialog box similar to the Create Empty Collection dialog box (FIG. 32) appears, and the user enters the collection name and description and selects a representative icon.

Additional devices may be added to a collection by dragging the devices from device palettes or the list of devices in the device database and dropping the devices onto the collection icon.

To connect devices resident in different collections, the user expands the design sheet of one of the collections, clicks the right mouse button while the cursor is over the device within the collection to be connected to, and selects a Connect Offpage option 350 (FIG. 12) from the device pop-up menu. The user may now carry the connection to a target device in another open collection, or the user may navigate to find the target device by, for example, using the scroll bars and opening and closing various collections.

Once an off-page connection is made, an off-page connector box 352, 354 (FIG. 31) appears in the top left corner of the collection design sheet. The off-page connector box shows the user all the other design sheets to which the devices in that collection are connected. Off-page connector boxes may be hidden by selecting a Hide Off-page Connector button 356 (FIG. 2).

Collections may be exported to the computer's hard disk so that they may be imported into other design sheets. To export a collection, the user moves the cursor over the collection icon, clicks the right mouse button, and selects an Add option followed by an Export as Sheet option from a pop-up menu that appears. To import a collection, the user moves the cursor to an empty portion of the design sheet, clicks the right mouse button, and selects the Add option followed by an Imported Design Sheet option. The user is then prompted to select the icon representing the desired collection.

Alternatively, the collection icon is added to a device palette and copies of the collection may be added to design sheets using the drag-and-drop technique.

Referring to FIG. 34, instead of connecting a single device to a target device, the user may save time and connect a group of devices 358 to a target device 360. The group may be homogeneous or heterogeneous, provided all devices have compatible ports. For example, the user may select an AST PC and a Sun workstation and group connect them to a target hub. To complete a group connection, the user selects a media type and then selects a group of devices by drawing a marquee around the group. The user then clicks the right mouse button to pull up the marquee pop-up menu (FIG. 33) and selects a Group Connect option 362. The user completes the connection by carrying the connection to the target device and clicking the left mouse button. Each device in the group now has its own media line 364a–364e connection to the target device.

Instead of dropping-and-dragging devices from device palettes or the list of devices in the device database, a user may save time and clone a preconfigured device. For example, if a user is going to connect ten identical PCs via a 10BaseT connection to a single hub, the user can drop one PC onto the design sheet, configure the PC with a 10BaseT card, and then clone the configured PC nine times. All ten PCs may then be group connected to the hub.

To clone a device, the user begins by moving the cursor over the device, clicking the right mouse button to pull up the device pop-up menu (FIG. 12), and selecting a Clone option 366. A Clone Device dialog box 368 (FIG. 35) appears. The user specifies a number of copies of the device in an entry box 370, selects a name option for the clones through choices in a Name Options box 372, and selects a clone layout through a Layout of Devices box 374. The user then selects a Clone in Place button 376 to add the clones to the current design sheet or a Clone to Collection button 378 to add the clones to a particular collection.

Figure 9:
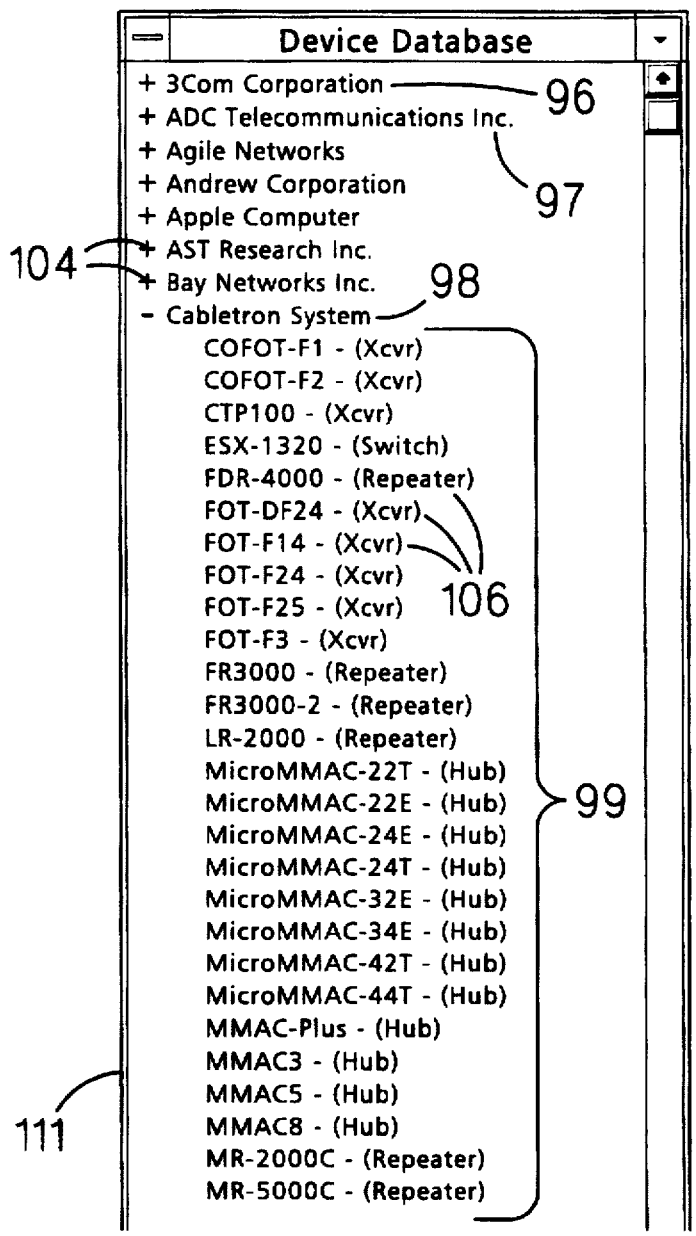
FIG. 9 is a computer screen display of a list of devices stored in a device database.

The device database includes several "generic" devices that the user may select if a particular vendor-specific device is not available. There are three types of generic objects; a generic configurable device, a generic non-configurable device, and a generic service. To add a generic device or service to a design sheet, the user pulls up the File menu (FIG. 4) and selects the Load Device Database option to display the list of devices in the device database (FIG. 9). The user then scrolls to the Generic "vendor" categories 380, 382, 384 (FIG. 36) and expands (by clicking on the [+]) the desired category.

Generic configurable devices are partially configurable. For example, several of these devices may represent PCs and may be categorized by bus type (EISA, ISA, PCI, PCMCIA, or MicroChannel). These devices may be configured with particular adapter cards, and the network design software may validate connections to these devices.

Generic non-configurable devices cannot be configured, and the network design software cannot validate connections made to these devices. The user may, however, specify a maximum number of connections that may be made to a particular generic non-configurable device and the network design software will check each connection made to the device to determine if the maximum number has been exceeded.

Generic service objects are used to represent leased network services. The leased network services include Asynchronous Transfer Mode (ATM), Packet Data Network X.25 (PDN X.25), Switched Multimegabit Data Service (SMDS), Frame Relay, Synchronous Optical Network (SONET), and Integrated Services Digital Network (ISDN). A user may use a generic service to represent a Wide Area Network (WAN) in a design. For example, a Frame Relay service object may be used to connect three regional offices. The network design software tracks the logical protocol for devices connecting to generic services. For example, if a router tries to connect to a Frame Relay service icon and the router is configured with an X.25 protocol, the network design software detects a logical protocol mismatch and prompts the user to take corrective actions.

After calling up the screen menu (FIG. 5), the user can select the Add option and then a Free-form Text option (not shown). Through this option, the user may add text to any location in the design sheet. The user may then move added text through the drag-and-drop technique.

Also through the screen menu, the user can select a Show Notes option 386, and through this object, the user can add, modify, and delete design sheet notes. A note icon is displayed on corresponding device sheets to notify the user that a note exists.

The user may select a Customize Media option 388 in the screen menu to view and/or modify current media line colors and patterns.

Referring to FIGS. 37 and 38, a user may modify the appearance of a device icon 389 or collection icon through an Edit Pictures option 390 (FIG. 4) in the File menu. When the Edit Pictures option is selected, the network design software displays a Device/Collection Pictures dialog box 392 in the application window. A list of icons is displayed in an icon window 394. The user may browse through the list using a More Pictures button 396, and when a desired icon 398 is located, the user may select it, drag it from the icon window, and drop it onto the current icon 389 to replace the current icon with the selected icon (FIG. 38). Alternatively, the user may draw an icon using, for example, Microsoft™ Paintbrush™, add the icon drawing to the Windows™ clipboard, and then import the drawing by selecting the Clipboard button 400. The devices with corresponding new icons may then be added to a device palette to allow the user to replicate the device/new icon.

For a more detailed description of the network design software see Professional Design™ User's Guide available from NetSuite™ Development L. P. Wayland, Mass. which is incorporated by reference.

Periodically, updates to the device database are made available via the World Wide Web to Netsuite Library subscribers.

Reference to Microfiche Appendix

A microfiche appendix containing C++ and Visual Basic 4.0 language source code for network design software consisting of 2970 microfiche images on 31 microfiche cards is filed herewith. A portion of the disclosure of the patent document contains material which is subject to copyright protection. The copyright owners have no objection to the facsimile reproduction by anyone of the patent document or the patent disclosure, as it appears in the Patent and Trademark Office patent file or records, but otherwise reserves all copyright rights whatsoever.

Other embodiments are within the scope of the following claims.

What is claimed is:

1. A method for designing networks comprising:

placing device icons representing intelligent device objects on a network design sheet;

selecting a media type representing an intelligent media object;

connecting the media type to a first one of the device icons; and validating the connection to the first one of the device icons prior to connecting the media type to any of the other device icons.

2. The method of claim 1, further comprising:

preventing the connection from being made if the validation indicates an invalid connection.

3. The method of claim 1, further comprising:

prompting a user to take additional actions before completing the connection if the validation indicates that the connection is invalid but can be made valid.

4. The method of claim 3, wherein the additional actions include:

configuring the first one of the device icons to include an adapter card.

5. The method of claim 3, wherein the additional actions include:

adding an additional device icon to the network.

6. The method of claim 1, further comprising:

connecting the media type to a second one of the device icons after validating the connection to the first one of the device icons; and validating the connection to the second one of the device icons.

7. The method of claim 6, further comprising:

validating the media connection between the first and second ones of the device icons.

8. The method of claim 6, further comprising:

preventing the connection to the second one of the device icons from being made if the validation indicates an invalid connection.

9. The method of claim 1, further comprising:

prompting a user to take additional actions before completing the connection to a second one of the device icons if the validation indicates that the connection is invalid but can be made valid.

10. The method of claim 9, wherein the additional actions include:

configuring the second one of the device icons to include an adapter card.

11. The method of claim 9, wherein the additional actions include:
adding an additional device icon to the network.

12. The method of claim 1, further comprising:
displaying the device icons in a device palette;
modifying a configuration of one of the device icons; and
customizing the device palette by adding the modified device icon to the device palette.

13. The method of claim 1, further comprising:
grouping connected device icons into a collection.

14. The method of claim 13, further comprising:
connecting a device icon from the collection to a device icon in another collection to form a computer network hierarchy.

15. The method of claim 13, further comprising:
adding a device icon to the collection by dropping the device icon on a collection icon.

16. The method of claim 1, further comprising:
generating a spreadsheet including data corresponding to a designed computer network.

17. The method of claim 1, further comprising:
displaying a layout in the network design sheet.

18. The method of claim 17, wherein the layout represents an office layout.

19. The method of claim 17, wherein the layout represents a country with marked office locations.

20. A computer program for designing computer networks, the computer program being stored on a media readable by a general purpose computer, for configuring the computer upon being read and executed by the computer to perform functions comprising:
displaying device icons representing intelligent devices objects on a display screen of the computer;
displaying media types for connecting the device icons on the display screen;
displaying a network design sheet on the display screen;
allowing a user to design a computer network by selecting at least two device icons from the displayed device icons, placing the at least two device icons on the network design sheet, selecting a media type from the displayed media types, and connecting the media type to a first one of the at least two device icons on the network design sheet; and
validating the connection between the at least two device icons prior to connecting the media type to any other of the at least two device icons.

21. The computer program of claim 20, wherein the device icons are displayed in a palette on the display screen.

22. The computer program of claim 20, wherein the media types are displayed in a pull-down menu on the display screen.

23. The computer program of claim 20, further comprising:
storing the intelligent device objects in a memory accessible by the computer.

24. The computer program of claim 20, wherein the computer is further configured upon the computer program being read and executed to perform functions comprising:
preventing the media type connection to the first of the at least two device icons if the validation indicates an invalid connection.

25. The computer program of claim 20, wherein the computer is further configured upon the computer program being read and executed to perform functions comprising:
prompting a user to take additional actions before completing the connection to the first one of the at least two device icons if the validation indicates that the connection is invalid but can be made valid.

26. The computer program of claim 25, wherein the additional actions include:
configuring the first one of the device icons to include an adapter card.

27. The computer program of claim 20, further comprising:
connecting the media type to a second one of the at least two device icons after validating the connection to the first one of the device icons;
validating the connection to the second one of the at least two device icons;
prompting the user to take additional actions before completing the connection to the second one of the at least two device icons if the validation indicates that the connection is invalid but can be made valid, wherein the additional actions include: adding an additional device icon to the network being designed.

28. An article of manufacture comprising:
a computer usable medium having computer readable program code embodied therein for assisting a user in designing a computer network, the computer readable program code in the article of manufacture comprising:
computer readable program code for causing a computer to display device icons representing intelligent devices objects on a display screen of the computer;
computer readable program code for causing the computer to display media types for connecting the device icons on the display screen;
computer readable program code for causing the computer to display a network design sheet on the display screen;
computer readable program code for causing the computer to allow the user to design the computer network by selecting at least two device icons from the displayed device icons, placing the at least two device icons on the network design sheet, selecting a media type from the displayed media types, and connecting the media type to a first one of the at least two device icons on the network design sheet; and
computer readable program code for causing the computer to validate the connection to the first of the at least two device icons prior to connecting the media type to any other of the at least two device icons.

29. The article of manufacture of claim 28 further comprising:
computer readable program code for causing the computer to prevent the media type connection to the first one of the at least two device icons if the validation indicates an invalid connection.

30. The article of manufacture of claim 28 further comprising:
computer readable program code for causing the computer to prompt the user to take additional actions before completing the connection to the first one of the at least two device icons if the validation indicates that the connection is invalid but can be made valid.

31. The article of manufacture of claim 30, wherein the additional actions include:
configuring the first one of the device icons to include an adapter card.

32. The article of manufacture of claim 30, further comprising:

computer readable program code for causing the computer to allow the user to design the computer network by connecting the media type to a second one of the at least two device icons after validating the connection to the first one of the device icons;

computer readable program code for causing the computer to validate the connection to the second one of the at least two device icons;

computer readable program code for causing the computer to prompt the user to take additional actions before completing the connection to the second one of the at least two device icons if the validation indicates that the connection is invalid but can be made valid, wherein the additional actions include:

adding an additional device icon to the network being designed.

33. A method for designing computer networks comprising:

displaying device icons representing intelligent device objects in a device palette;

modifying a configuration of the intelligent device object being represented by one of the device icons;

customizing the device palette by adding the modified device icon to the device palette; and using one of the device icons from the modified devices palette in a displayed network sheet.

34. A computer program for designing computer networks, the computer program being stored on a media readable by a general purpose computer, for configuring the computer upon being read and executed by the computer to perform functions comprising:

displaying device icons representing intelligent device objects in a device palette;

modifying configuration of the intelligent device object being represented by one of the device icons;

customizing the device palette by adding the modified device icon to the device palette; and allowing a user to use one of the device icons from the modified device palette in a network design sheet.

35. An article of manufacture comprising:

a computer usable medium having computer readable program code embodied therein for assisting a user in designing a computer network, the computer readable program code in the article of manufacture comprising:

computer readable program code for causing a computer to display device icons representing intelligent device objects in a device palette;

computer readable program code for causing the computer to modify a configuration configuration the intelligent device object being represented by one of the device icons;

computer readable program code for causing the computer to customize the device palette by adding the modified device icon to the device palette; and computer readable program code for causing the computer to allow the user to use one of the device icons from the modified device palette in a network design sheet.

36. A method of designing computer networks comprising:

displaying device icons on a design sheet;

grouping connected device icons on the design sheet into a collection; and representing the collection with a collection icon.

37. The method of claim 36, further comprising:

connecting a device icon from the collection to a device icon in another collection to form a computer network hierarchy.

38. The method of claim 36, further comprising:

adding a device icon to the collection by dropping the device icon on a collection icon.

39. A computer program for designing computer networks, the computer program being stored on a media readable by a general purpose computer, for configuring the computer upon being read and executed by the computer to perform functions comprising:

displaying a design sheet populated with device icons;

grouping connected device icons on the design sheet into a collection; and representing the collection with a collection icon.

40. The computer program of claim 39, wherein the computer is configured to perform further functions comprising:

connecting a device icon from the collection to a device icon in another collection to form a computer network hierarchy.

41. The computer program of claim 39, wherein the computer is configured to perform further functions comprising:

adding a device icon the collection by dropping the device icon on the collection icon.

42. An article of manufacture comprising:

a computer usable medium having computer readable program code embodied therein for assisting a user in designing a computer network, the computer readable program code in the article of manufacture comprising:

computer readable program code for causing a computer to display a design sheet populated with device icons;

computer readable program code for causing the computer to group connected device icons on the design sheet into collection; and computer readable program code for causing the computer to represent the collection with a collection icon.

43. The article of manufacture of claim 42, wherein the computer readable program code further includes:

computer readable program code for causing the computer to connect a device icon from the collection to a device icon in another collection to form a computer network hierarchy.

44. The article of manufacture of claim 42, wherein the computer readable program code further includes:

computer readable program code for causing the computer to add a device icon to the collection by dropping the device icon on the collection icon.

* * * * *